United States Patent
Bai

(10) Patent No.: US 10,454,550 B2
(45) Date of Patent: Oct. 22, 2019

(54) MULTIWAY SWITCH, RADIO FREQUENCY SYSTEM, AND WIRELESS COMMUNICATION DEVICE

(71) Applicant: Guangdong Oppo Mobile Telecommunications Corp., Ltd., Dongguan, Guangdong (CN)

(72) Inventor: Jian Bai, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 16/180,534

(22) Filed: Nov. 5, 2018

(65) Prior Publication Data
US 2019/0288754 A1    Sep. 19, 2019

(30) Foreign Application Priority Data
Mar. 16, 2018  (CN) .......................... 2018 1 0220715

(51) Int. Cl.
*H04B 7/00* (2006.01)
*H04B 7/06* (2006.01)
(Continued)

(52) U.S. Cl.
CPC ......... *H04B 7/0602* (2013.01); *H04L 5/0048* (2013.01); *H01Q 1/243* (2013.01)

(58) Field of Classification Search
CPC .. G06F 3/033; H01P 1/10; H03H 7/46; H04B 1/00; H04B 1/28; H04B 1/38; H04B 1/40;
(Continued)

(56) References Cited

U.S. PATENT DOCUMENTS 7,633,357 B2 * 12/2009 Hangai ..................... H01P 1/15
                                                                  333/103
9,831,940 B2 * 11/2017 Patel .................. H04B 7/18584
(Continued)

FOREIGN PATENT DOCUMENTS

CN        101867402 A    10/2010
CN        103905104 A     7/2014
(Continued)

OTHER PUBLICATIONS

International search report issued in corresponding international application No. PCT/CN2018/112761 dated Jan. 30, 2019.
(Continued)

*Primary Examiner* — Shawkat M Ali
(74) *Attorney, Agent, or Firm* — Young Basile Hanlon & MacFarlane, P.C.

(57) ABSTRACT

A multiway switch and related products are provided. The multiway switch includes seven throw (T) ports and $2^n$ pole (P) ports, and the seven T ports include one first T port coupled with all of the $2^n$ P ports. n is an integer and $n \geq 2$. The multiway switch is configured to be coupled with a radio frequency circuit and an antenna system of an electronic device operable in a dual-frequency single-transmit mode, to implement a preset function of the electronic device, the antenna system includes $2^n$ antennas corresponding to the $2^n$ P ports, and the preset function being a function of transmitting a sounding reference signal (SRS) through the $2^n$ antennas in turn.

19 Claims, 15 Drawing Sheets

(51) Int. Cl.
*H04L 5/00* (2006.01)
*H01Q 1/24* (2006.01)

(58) Field of Classification Search
CPC . H04B 1/44; H04B 1/48; H04B 1/006; H04B 1/401; H04B 1/403; H04B 7/08; H04B 7/108; H04B 7/185; H04B 7/0413; H04B 7/0602; H04B 7/18582; H04B 7/18584; H04L 5/14; H04L 25/0228; H04W 36/00; H04W 36/34; H04W 36/0027; H04W 40/16; H04W 52/52; H04W 72/12; H04W 88/02; H04W 88/06
USPC ......... 333/101, 103; 370/281; 375/219, 260, 375/262, 267, 295, 316; 455/73, 83, 130, 455/552, 552.1, 557

See application file for complete search history.

(56) References Cited

U.S. PATENT DOCUMENTS

| | | |
|---|---|---|
| 2009/0054093 A1 | 2/2009 | Kim et al. |
| 2013/0308554 A1 | 11/2013 | Ngai et al. |
| 2017/0195004 A1 | 7/2017 | Cheng et al. |
| 2017/0373368 A1* | 12/2017 | Srirattana ............... H01P 5/18 |
| 2018/0152955 A1* | 5/2018 | Park .................. H04W 36/0027 |
| 2018/0205413 A1* | 7/2018 | Patel ..................... H03F 3/195 |

FOREIGN PATENT DOCUMENTS

| | | |
|---|---|---|
| CN | 105245295 A | 1/2016 |
| CN | 106559277 A | 4/2017 |
| CN | 106685621 A | 5/2017 |
| CN | 108199725 A | 6/2018 |
| CN | 108199726 A | 6/2018 |
| CN | 108199727 A | 6/2018 |
| CN | 108199728 A | 6/2018 |
| CN | 108462498 A | 8/2018 |
| WO | 2012026601 A1 | 3/2012 |
| WO | 2012109988 A1 | 8/2012 |
| WO | 2015131020 A1 | 9/2015 |

OTHER PUBLICATIONS

Gao Xiang et al:"Multi-Switch for Antenna Selection in Massive MIMO", 2015 IEEE global communications Conference (Globecom), IEEE, Dec. 6, 2015.

Guy Lemieux et al:"Generating highly-routable sparse crossbars for PLDs", FPGA '00. ACM/SIGDA International Symposium on Field Programmable Gate Arrays, Feb. 1, 2000.

Extended European search report issued in corresponding European application No. 18204504.7 dated May 29, 2019.

* cited by examiner

MULTIWAY SWITCH, RADIO FREQUENCY SYSTEM, AND WIRELESS COMMUNICATION DEVICE

CROSS-REFERENCE TO RELATED APPLICATION(S)

This application claims priority to Chinese Patent Application No. 201810220715.6, filed on Mar. 16, 2018, the disclosure of which is hereby incorporated by reference in its entirety.

TECHNICAL FIELD

This disclosure relates to the field of communication technology, and particularly to a multiway switch, a radio frequency system, and a wireless communication device.

BACKGROUND

With the widespread use of electronic devices such as smart phones, the smart phone can support an increasing number of applications and is becoming more and more powerful. The smart phone is developing in a diversified and personalized way, becoming indispensable electronic products in users' life. In the fourth generation (4G) mobile communication system, the electronic device generally adopts a single-antenna or dual-antenna radio frequency system architecture. Currently, in a new radio (NR) system of the fifth generation (5G) mobile communication system, an electronic device supporting a four-antenna radio frequency system architecture is proposed.

SUMMARY

Implementations of the disclosure provide a multiway switch, a radio frequency system, and a wireless communication device, to implement a function of transmitting a sounding reference signal (SRS) through $2^n$ antennas corresponding to $2^n$ ports in turn (that is, $2^n$-port SRS) of an electronic device in the fifth generation new radio (5G NR).

According to a first aspect of implementations of the disclosure, a multiway switch is provided. The multiway switch includes seven throw (T) ports and $2^n$ pole (P) ports, and the seven T ports include one first T port coupled with all of the $2^n$ P ports. n is an integer and n≥2.

The multiway switch is configured to be coupled with a radio frequency circuit and an antenna system of an electronic device operable in a dual-frequency single-transmit mode, to implement a preset function of the electronic device, the antenna system includes $2^n$ antennas corresponding to the $2^n$ P ports, and the preset function is a function of transmitting a sounding reference signal (SRS) through the $2^n$ antennas in turn.

According to a second aspect of implementations of the disclosure, a radio frequency system is provided. The radio frequency system includes an antenna system, a radio frequency circuit, and a multiway switch coupled with the radio frequency circuit and the antenna system.

The multiway switch includes seven T ports and $2^n$ P ports. n is an integer and n≥2. The seven T ports include one first T port at least supporting a transmission function and six second T ports supporting only a reception function. The first T port is coupled with all of the $2^n$ P ports and each of the six second T ports is coupled with one of the $2^n$ P ports and T ports at the same frequency band in the six second T ports are coupled with different P ports. Each of the $2^n$ P ports is configured to be coupled with a corresponding antenna of the $2^n$ antennas. The antenna system includes $2^n$ antennas corresponding to the $2^n$ P ports and the multiway switch is configured to implement a preset function of transmitting an SRS through the $2^n$ antennas in turn.

According to a third aspect of implementations of the disclosure, a wireless communication device is provided. The wireless communication device includes an antenna system, a radio frequency transceiver, a radio frequency circuit coupled with the radio frequency transceiver, and a multiway switch coupled with the radio frequency circuit and the antenna system.

The multiway switch includes seven T ports and $2^n$ P ports. n is an integer and n≥2. The seven T ports include one first T port at least supporting a transmission function and six second T ports supporting only a reception function. The first T port is coupled with all of the $2^n$ P ports and each of the six second T ports is coupled with one of the $2^n$ P ports and T ports at the same frequency band in the six second T ports are coupled with different P ports. Each of the $2^n$ P ports is configured to be coupled with a corresponding antenna of the $2^n$ antennas. The antenna system includes $2^n$ antennas corresponding to the $2^n$ P ports and the multiway switch is configured to implement a preset function of transmitting an SRS through the $2^n$ antennas in turn.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can also be included.

The term "embodiment" or "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The electronic device involved in the implementations of the present disclosure may include various handheld devices, in-vehicle devices, wearable devices, computing devices that have wireless communication functions or other processing devices connected to the wireless modem, as well as various forms of user equipment (UE), mobile stations (MS), terminal devices, and the like. For the convenience of description, the above-mentioned devices are collectively referred to as an electronic device.

The implementations of the present disclosure are described briefly below.

Figure 1A:
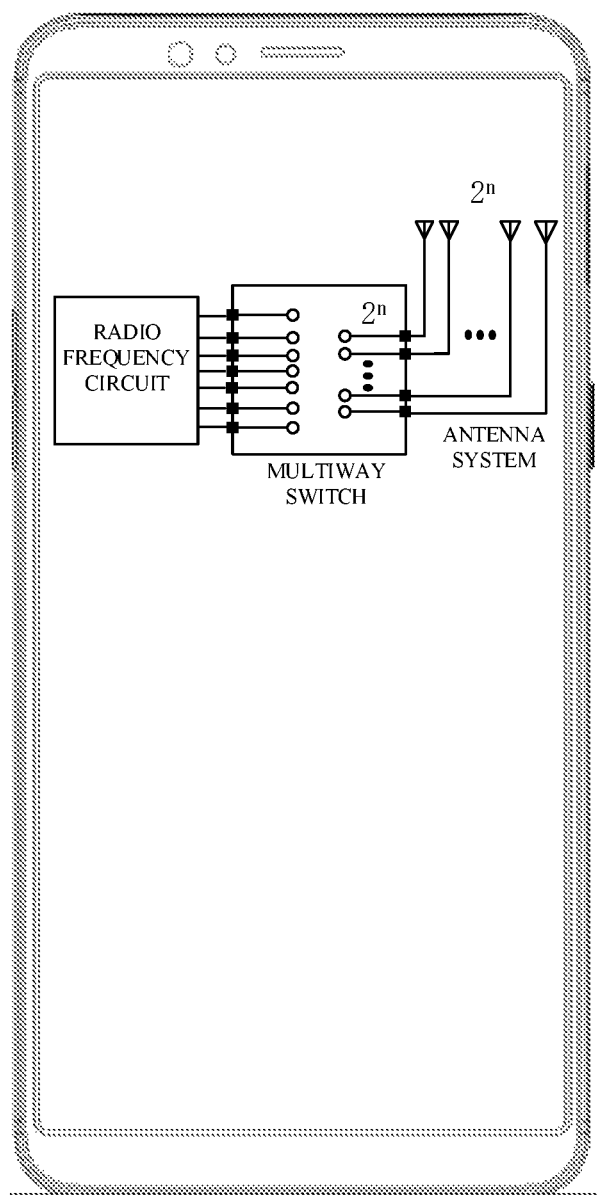
FIG. 1A is a schematic structural diagram illustrating a multiway switch according to an implementation of the disclosure.

According to the implementations of the disclosure, a multiway switch is provided. As illustrated in FIG. 1A, the multiway switch includes seven throw (T) ports and $2^n$ pole (P) ports, and the seven T ports include one first T port coupled with all of the $2^n$ P ports. n is an integer and n≥2. The multiway switch is configured to be coupled with a radio frequency circuit and an antenna system of an electronic device operable in a dual-frequency single-transmit mode, to implement a preset function of the electronic device, the antenna system includes $2^n$ antennas corresponding to the $2^n$ P ports, and the preset function is a function of transmitting a sounding reference signal (SRS) through the $2^n$ antennas in turn.

In one implementation, the seven T ports further include six second T ports, each of the six second T ports is coupled with one of the $2^n$ P ports and T ports at the same frequency band in the six second T ports are coupled with different P ports. Each of the $2^n$ P ports is configured to be coupled with a corresponding antenna of the $2^n$ antennas. The first T port at least supports a transmission function and the six second T ports support only a reception function.

In one implementation, the radio frequency circuit of the electronic device logically includes two transmitter circuits and $2^{n+1}$ receiver circuits, the radio frequency circuit physically includes m independent circuit modules, m is an integer, and m≥1. The m independent circuit modules have a transmit-receive port configured to be coupled with the first T port and have receive ports configured to be coupled in one-to-one correspondence with the second T ports.

According to the implementations of the disclosure, a radio frequency system is provided. The radio frequency system includes an antenna system, a radio frequency circuit, and a multiway switch coupled with the radio frequency circuit and the antenna system.

The multiway switch includes seven T ports and $2^n$ P ports. n is an integer and n≥2. The seven T ports include one first T port at least supporting a transmission function and six second T ports supporting only a reception function. The first T port is coupled with all of the $2^n$ P ports. Each of the six second T ports is coupled with one of the $2^n$ P ports and T ports at the same frequency band in the six second T ports are coupled with different P ports. Each of the $2^n$ P ports is configured to be coupled with a corresponding antenna of the $2^n$ antennas. The antenna system includes $2^n$ antennas corresponding to the $2^n$ P ports. The multiway switch is configured to implement a preset function of transmitting an SRS through the $2^n$ antennas in turn.

According to the implementations of the disclosure, a wireless communication device is provided. The wireless communication device includes an antenna system, a radio frequency transceiver, a radio frequency circuit coupled with the radio frequency transceiver, and a multiway switch coupled with the radio frequency circuit and the antenna system.

The multiway switch includes seven T ports and $2^n$ P ports. n is an integer and n≥2. The seven T ports include one first T port at least supporting a transmission function and six second T ports supporting only a reception function. The first T port is coupled with all of the $2^n$ P ports. Each of the six second T ports is coupled with one of the $2^n$ P ports and T ports at the same frequency band in the six second T ports are coupled with different P ports. Each of the $2^n$ P ports is configured to be coupled with a corresponding antenna of the $2^n$ antennas. The antenna system includes $2^n$ antennas corresponding to the $2^n$ P ports. The multiway switch is configured to implement a preset function of transmitting an SRS through the $2^n$ antennas in turn.

The following describes the case where n=2, that is, four antennas and four P ports are configured, as an example. It is to be noted that, the number of the antennas and the P ports are not limited to four, and the number thereof can be extended to $2^n$ (n being an integer and n≥2) in the implementations of the disclosure. In the case where $2^n$ antennas and $2^n$ P ports are configured, with regard to logical composition of the radio frequency circuit, physical composition of the radio frequency circuit, coupling between the independent circuit modules and the T ports, coupling between the T ports and the P ports, coupling between the P ports and the antennas, and the like, reference may be made in the following implementations. As for the principle of achieving the transmitting an SRS through the $2^n$ antennas in turn and the structure of simplified switch, reference may further be made to related descriptions in the following implementations.

At present, sounding reference signal (SRS) switching in four antennas of a mobile phone is a mandatory option for China mobile communications corporation (CMCC) in the China mobile fifth generation (5G) Scale Test Technical White Paper Terminal, which is optional in the 3rd generation partnership project (3GPP). Its main purpose is for a base station to determine quality and parameters of four channels via measuring an uplink signal of the four antennas of the mobile phone, to perform a beamforming of a downlink massive multi-input multi-output (MIMO) antenna array on the four channels according to a channel reciprocity, and finally to obtain the best data transmission performance for a downlink 4×4 MIMO.

In order to satisfy requirements of SRS switching in four antennas, implementations of the present disclosure provide a radio frequency architecture based on a simplified 4P7T antenna switch. Compared with a 3P3T/DPDT/multiway small switch switching scheme, the present switching scheme can reduce the number of series switches in each path by integrating all or part of switches into the 4P7T main switch), thereby reducing link loss and optimizing the overall transmission and reception performance of the terminal. The implementations of the present disclosure are described in detail below.

In the implementations of the disclosure, the abbreviation "LNA" refers to a low-noise amplifier and the abbreviation "PA" refers to a power amplifier.

Figure 1B:
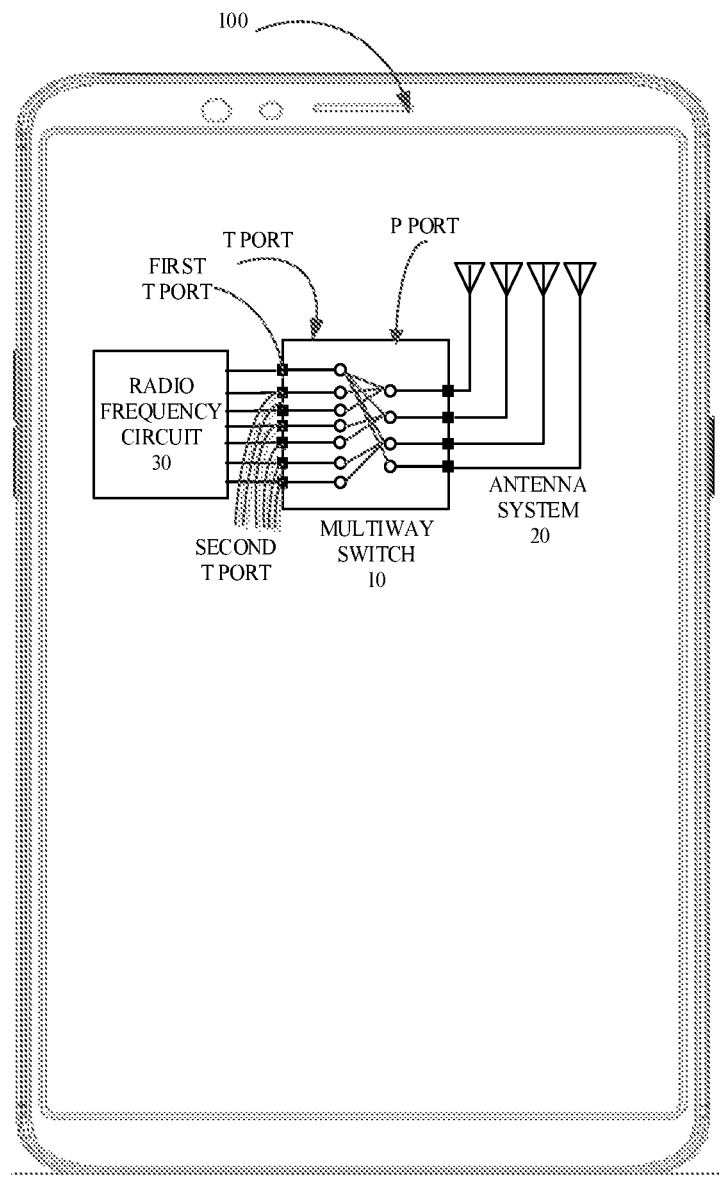
FIG. 1B is a schematic structural diagram illustrating a multiway switch according to an implementation of the disclosure.

FIG. 1B is a schematic structural diagram illustrating a multiway switch 10 according to an implementation of the disclosure. The multiway switch 10 includes seven throw (T) ports and four pole (P) ports and the seven T ports include one first T port coupled with all of the four P ports (that is, fully-coupled). The multiway switch 10 is applicable to an electronic device 100 operable in a dual-frequency single-transmit mode. The electronic device 100 includes an antenna system 20 and a radio frequency circuit 30. The antenna system 20 includes four antennas. The four antennas correspond to the four P ports; specifically, the four antennas and the four P ports are in one-to-one correspondence.

The multiway switch 10 is configured to be coupled with the radio frequency circuit 30 and the antenna system 20 to implement a preset function of the electronic device 100. The preset function is a function of transmitting an SRS through the four antennas corresponding to the four P ports in turn, which can be understood as a four-port SRS function.

The electronic device 100 may be a mobile phone or other terminal devices supporting the fifth generation new radio (5G NR), such as a customer premise equipment (CPE) or a mobile wireless-fidelity (MIFI).

"P port" in the disclosure is the abbreviation of "pole port", which refers to ports coupled with antennas of the multiway switch. "T port" in the disclosure is the abbreviation of "throw port", which refers to ports coupled with radio frequency modules of the multiway switch. The multiway switch is a 4P7T switch for example. "Module" herein can refer to circuits and any combination of related components.

The concept of "coupling", "full-coupling", or other kinds of coupling between the T ports and the P ports of the multiway switch described in the implementations of the disclosure refers to a state in which the T ports are coupled with the P ports through first switch transistors. One T port or one P port may be one port of a second switch transistor. The first switch transistors are configured to control a unidirectional conduction state between the T ports and the P ports (including a unidirectional conduction state from the T ports to the P ports and a unidirectional conduction state from the P ports to the T ports). The first switch transistor can be, for example, a switch array including three field-effect transistors (such as three metal-oxide-semiconductor (MOS) transistors). When the first switch transistor is disconnected and not grounded, parasitic parameters will greatly affect performance of other connected ports. Therefore, the first switch transistor is implemented with three MOS transistors, where the three MOS transistors can be in a common source connection, that is, coupled at a common source. When the first switch transistor is disconnected, two MOS transistors at two ends are disconnected and one MOS transistor in the middle is grounded. The second switch transistor is configured to enable a corresponding port (T port or P port) and can be, for example, a MOS transistor. The specific configurations of the first switch transistor and the second switch transistor are not limited herein. As one implementation, the electronic device can control paths between the T ports and the P ports to switch on through the first switch transistors. As one implementation, the electronic device can be provided with a dedicated controller to be coupled with switch transistors of the multiway switch.

The transmitting an SRS through the four antennas corresponding to the four P ports in turn refers to a process in which the electronic device interacts with a base station based on polling mechanism to determine quality of an uplink channel corresponding to each antenna.

In some implementations, in addition to the four first T ports, the seven T ports further include six second T ports, each of the six second T ports is coupled with one of the four P ports and T ports at the same frequency band in the six second T ports are coupled with different P ports. Each of the four P ports is coupled with a corresponding antenna (in other words, the four P ports are in one-to-one correspondence with the four antennas). The first T port at least supports a transmission function (that is, the first T port can be configured to transmit signals, and can also be configured to transmit and receive signals). The six second T ports support only a reception function (that is, the second T ports are merely configured to receive signals).

Since the seven T ports include one first T port fully coupled with the four P ports and each of the remaining six T ports is configured to be coupled with one fixed antenna for receiving, the number of built-in field-effect transistors, volume, and cost of the 4P7T switch can be reduced, and performance of the 4P7T switch can be improved as well. Details will be described hereinafter.

The dual-frequency single-transmit mode refers to an operating mode in which the electronic device can support dual frequency band-one uplink (UL) transmit path or dual frequency band-four downlink (DL) receive paths. The electronic device logically includes two transmitter circuits and eight receiver circuits. The multiway switch includes seven T ports and the electronic device is operable in the dual-frequency single-transmit mode, as illustrated in the schematic structural diagram of the multiway switch of FIG. 2, the number of the MOS transistors of the multiway switch is $7+(1*4+(7-1)*1)*3+4=41$.

As can be seen, in the implementation, the electronic device includes the antenna system, the radio frequency circuit, and the multiway switch. The antenna system includes the four antennas. The multiway switch includes the seven T ports and the four P ports. The multiway switch is configured to be coupled with the radio frequency circuit and the antenna system to implement a function of the electric device of transmitting a SRS through the four antennas corresponding to the four P ports in turn.

Figure 2:
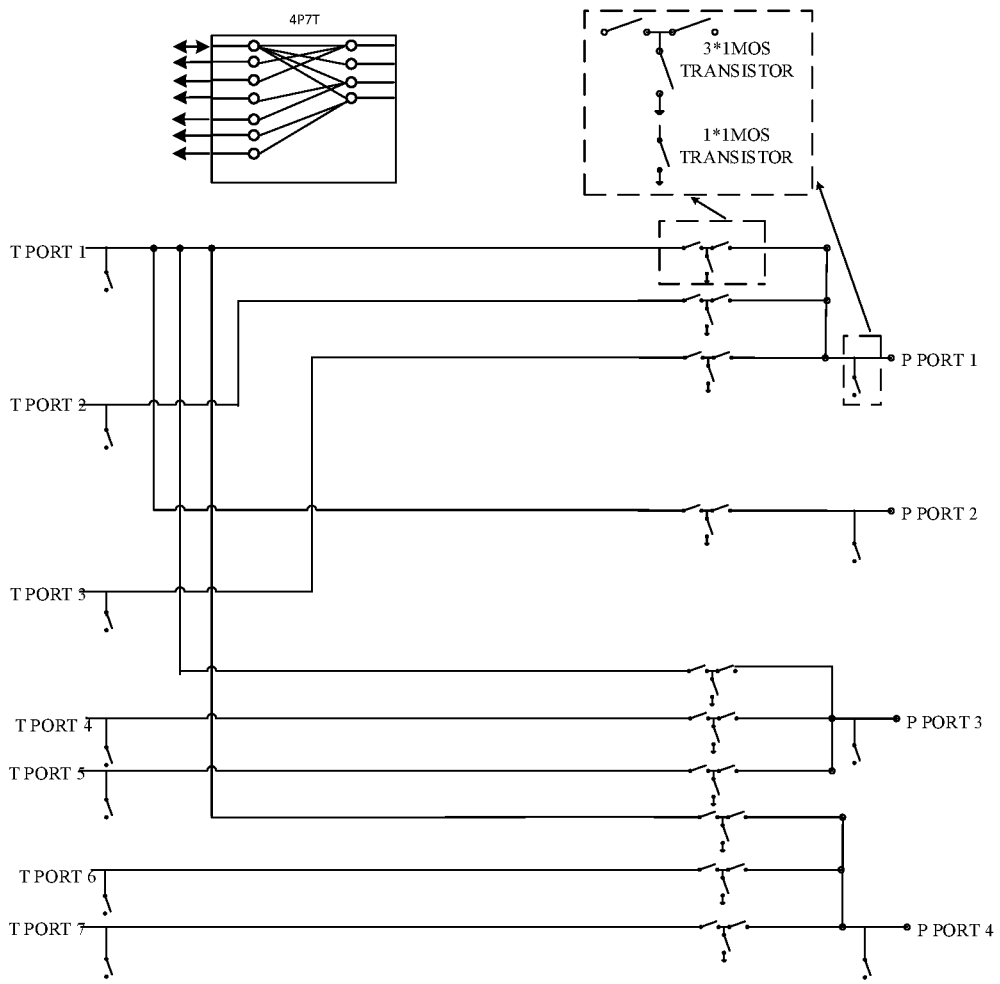
FIG. 2 is a schematic structural diagram illustrating a multiway switch according to an implementation of the disclosure.
Figure 3:
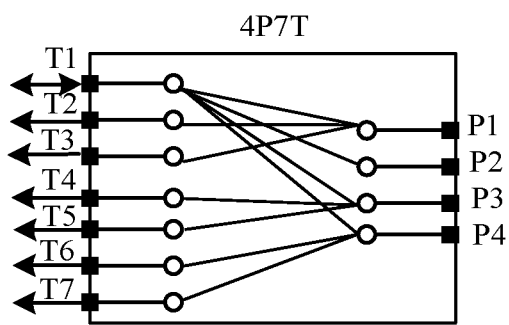
FIG. 3 is a schematic structural diagram illustrating a multiway switch corresponding to a structure illustrated in FIG. 2 according to an implementation of the present disclosure.

FIG. 3 is a schematic structural diagram illustrating a multiway switch corresponding to the structure illustrated in FIG. 2 according to an implementation of the present disclosure. As illustrated in FIG. 3, the multiway switch includes seven T ports and four P ports. The seven T ports are respectively marked as T1, T2, T3, T4, T5, T6, and T7, and the four P ports are respectively marked as P1, P2, P3, and P4. In one implementation, T1 is implemented as a TRX port that supports a transmission function and/or a reception function. T2, T3, T4, T5, T6, and T7 are implemented as RX ports that support only a reception function. Each of the four P ports is coupled with a port of the antenna system (that is, each of the four P ports is coupled with a corresponding antenna). It should be understood that, the ports T1, T2, T3, T4, T5, T6, T7, P1, P2, P3, and P4 are exemplary ports and the disclosure is not limited thereto.

In addition, it can be understood that, the cooperating manner of the radio frequency circuit and the multiway switch includes but is not limited to the exemplary structure of FIG. 3.

Figure 4:
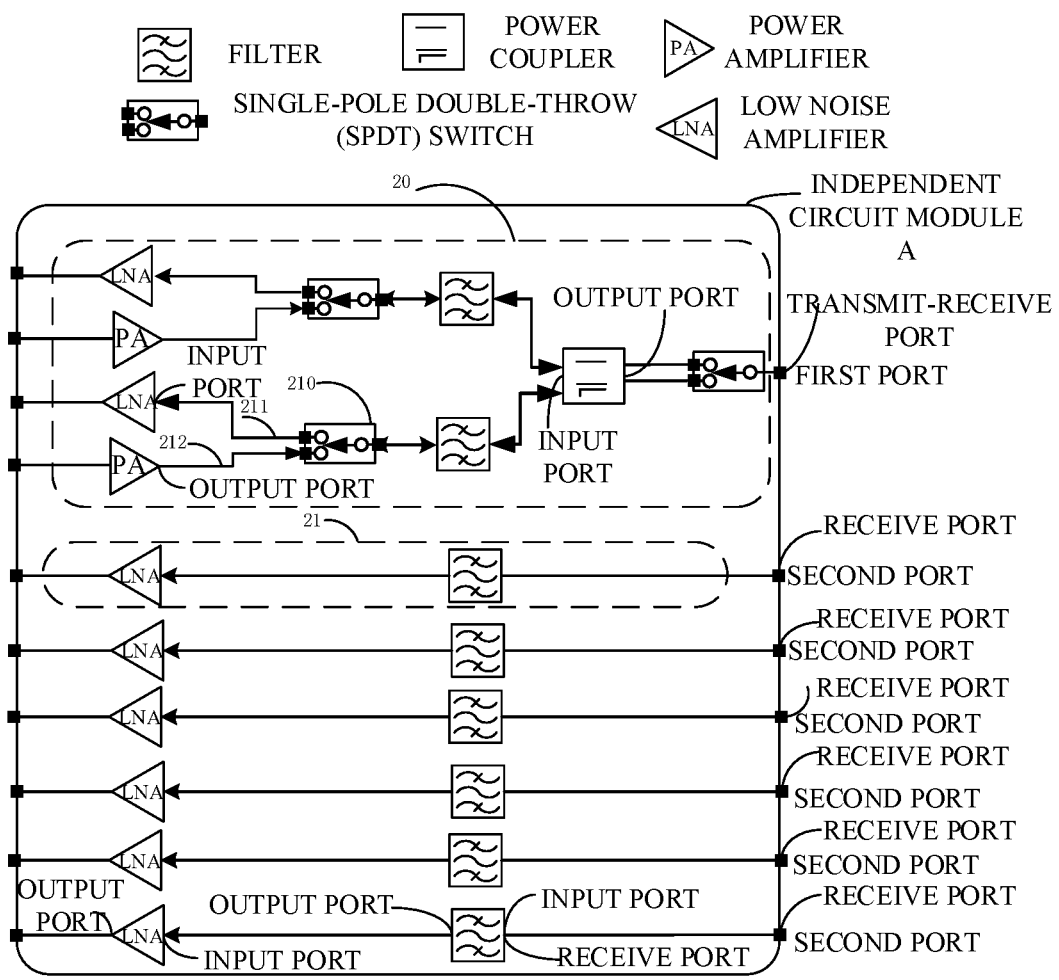
FIG. 4 is a schematic structural diagram illustrating a radio frequency circuit according to an implementation of the disclosure.

In one possible implementation, FIG. 4 is a schematic structural diagram illustrating a radio frequency circuit according to an implementation of the disclosure. As illustrated in FIG. 4, the radio frequency circuit 30 of the electronic device 100 logically includes two transmitter circuits and eight receiver circuits, and the radio frequency circuit 30 physically includes one independent circuit module. The independent circuit module has a transmit-receive port configured to be coupled with the first T port and has receive ports configured to be coupled in one-to-one correspondence with the second T ports.

The independent circuit module is embodied as a first independent circuit module. In this implementation, the first independent circuit module is embodied as independent circuit module A. The independent circuit module A includes one first port and multiple second ports, the first port is configured to be coupled with the first T port of the multiway switch, and the multiple second ports are configured to be coupled with the six second T ports of the multiway switch. In this implementation, as illustrated in FIG. 4, the independent circuit module A includes six second ports, which are configured to be coupled with the six second T ports in one-to-one correspondence. The independent circuit module A includes one transceiver integrated circuit 20 and six receiver circuits 21. The transceiver integrated circuit 20 includes two transceiver circuits 210, and the two transceiver circuits 210 have transmit-receive ports coupled with the first port of the independent circuit module A. Each transceiver circuit 210 includes one receiver circuit 211 and one transmitter circuit 212, and each receiver circuit 21 has a receive port coupled with one second port of the independent circuit module A. That is, each receive port is coupled with one of the six second ports of the independent circuit module A.

It can be seen that the multiway switch of the implementation of the disclosure can enable the electronic device to be operable in the dual-frequency single-transmit mode. It is beneficial to simplifying the radio frequency architecture of the terminal supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

In the implementation, each receiver circuit includes an LNA and a filter, the filter has an input port coupled with one first port or one second port of the independent circuit module A and has an output port coupled with an input port of the LNA, and the LNA has an output port configured to be coupled with a corresponding port of a radio frequency transceiver.

In the implementation, each transmitter circuit includes a PA, a filter, and a power coupler. The PA has an input port configured to be coupled with a corresponding port of the radio frequency transceiver and has an output port coupled with an input port of the filter, the filter has an output port coupled with an input port of the power coupler, and the power coupler has an output port coupled with the first port of the independent circuit module A.

In the implementation, each transceiver circuit is realized through one receiver circuit and one transmitter circuit that are integrated via a switch. The receiver circuit includes an LNA with an input port and the transmitter circuit includes a PA with an output port. The input port of the LNA and the output port of the PA are coupled with the switch. The switch is coupled with a filter, the filter is coupled with a power coupler, and the power coupler is coupled with the first port of the independent circuit module.

In the implementation, the transceiver integrated circuit includes two transceiver circuits operable at different frequency bands, the two transceiver circuits share an input port of the power coupler, and the power coupler has an output port coupled with the first port of the independent circuit module through the switch.

Figure 5:
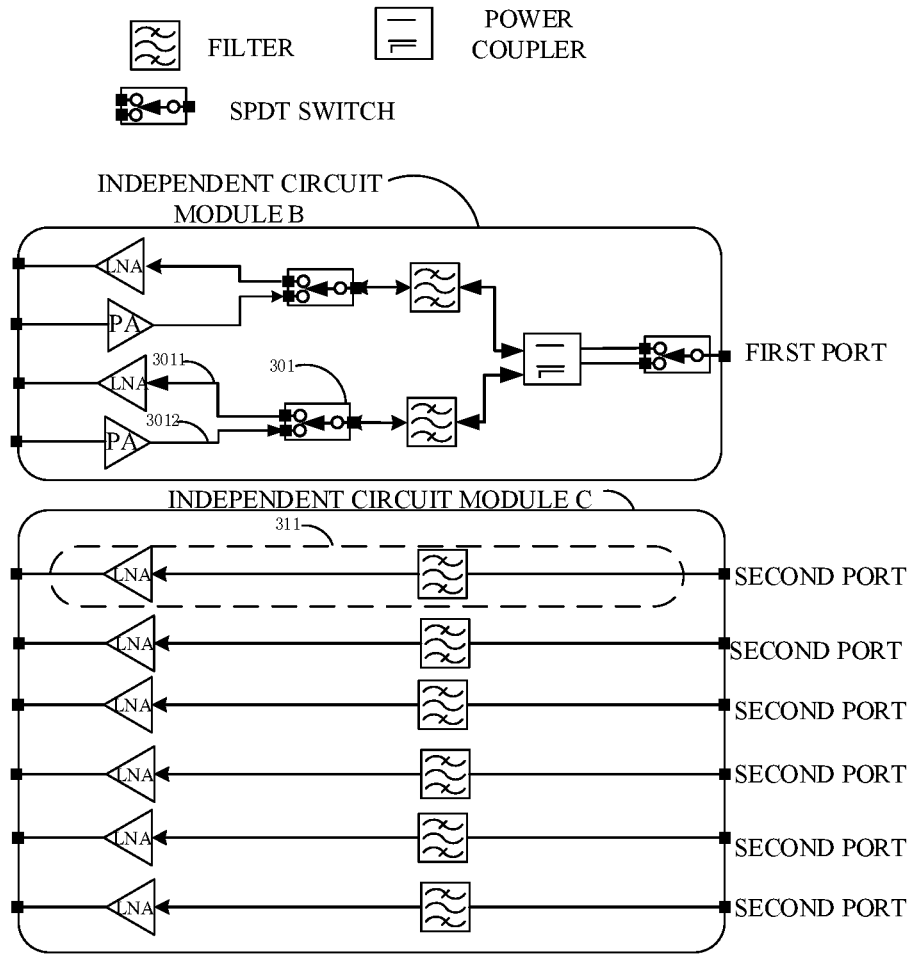
FIG. 5 is a schematic structural diagram illustrating another radio frequency circuit according to an implementation of the disclosure.

FIG. 5 is a schematic structural diagram illustrating another radio frequency circuit according to an implementation of the disclosure. In one possible implementation, as illustrated in FIG. 5, the radio frequency circuit 30 physically includes two independent circuit modules, that is, one first independent circuit module and one second independent circuit module. In this implementation, the first independent circuit module is embodied as independent circuit module B and the second independent circuit module is embodied as independent circuit module C. The independent circuit module B includes one first port configured to be coupled with the first T port of the multiway switch. The independent circuit module C includes multiple second ports configured to be coupled with the second T ports of the multiway switch. In one implementation, as illustrated in FIG. 5, the independent circuit module C includes six second ports.

The independent circuit module B includes one transceiver integrated circuit, the transceiver integrated circuit includes two transceiver circuits 301, the two transceiver circuits 301 have transmit-receive ports coupled with the first port of the independent circuit module B, and each transceiver circuit 301 includes one receiver circuit 3011 and one transmitter circuit 3012.

The independent circuit module C includes six receiver circuits 311 and each receiver circuit 311 has a receive port coupled with one second port of the independent circuit module C.

It can be concluded that the multiway switch of the implementation of the disclosure can enable the electronic device to be operable in the dual-frequency single-transmit mode. It is beneficial to simplifying the RF architecture of the terminal supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption. In addition, setting two independent circuit modules can also improve the performance of the switch circuit to some extent.

Figure 6:
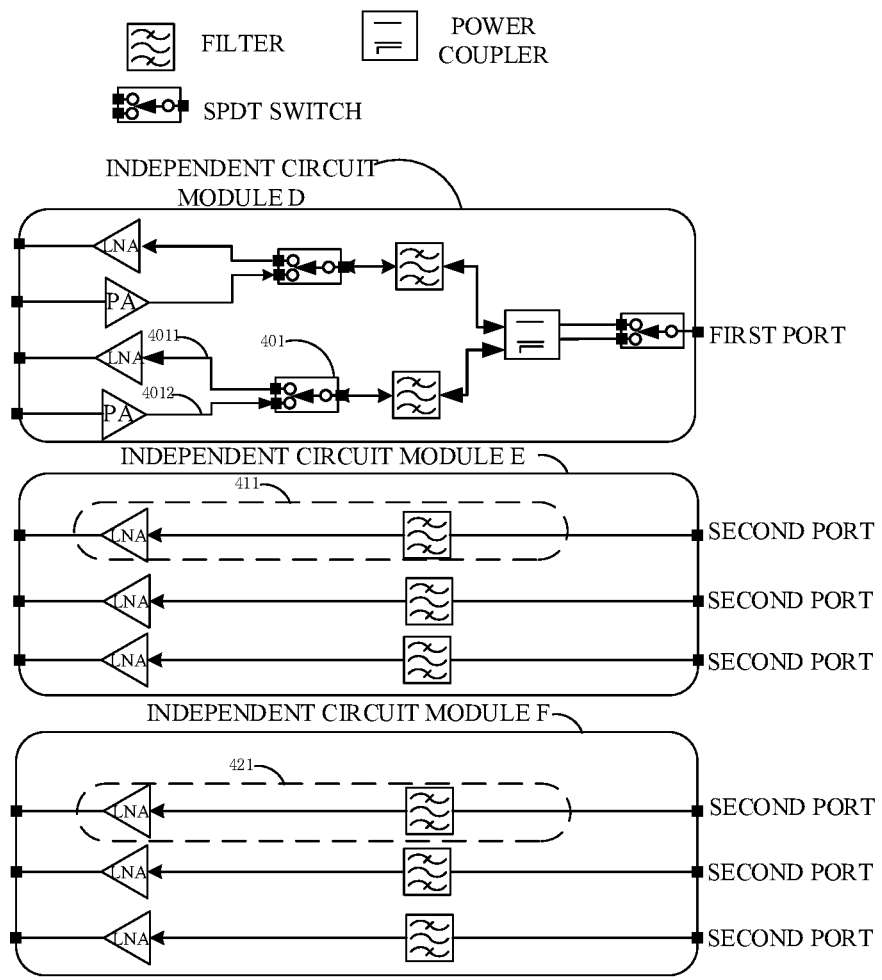
FIG. 6 is a schematic structural diagram illustrating yet another radio frequency circuit according to an implementation of the disclosure.

FIG. 6 is a schematic structural diagram illustrating yet another radio frequency circuit according to an implementation of the disclosure. In one possible implementation, as illustrated in FIG. 6, the radio frequency circuit 30 physically includes three independent circuit modules, that is, one first independent circuit module, one second independent circuit module, and one third independent circuit module. In this implementation, the first independent circuit module is embodied as independent circuit module D, the second independent circuit module is embodied as independent circuit module E, and the third independent circuit module is embodied as independent circuit module F. The independent circuit module D includes one first port configured to be coupled with the first T port of the multiway switch. The independent circuit module E and the independent circuit module F each include multiple second ports, and each second port is configured to be coupled with one second T port (i.e., one of six second T ports) of the multiway switch. In one implementation, as illustrated in FIG. 6, the independent circuit module E and the independent circuit module F each include three second ports.

The independent circuit module D includes one transceiver integrated circuit, the transceiver integrated circuit includes two transceiver circuits 401, the two transceiver circuits 401 include transmit-receive ports coupled with the first port of the independent circuit module D, and each transceiver circuit 401 includes one receiver circuit 4011 and one transmitter circuit 4012.

The independent circuit module E includes three receiver circuits 411, and each receiver circuit 411 has a receive port coupled with one second port of the independent circuit module E.

The independent circuit module F includes three receiver circuits 421 and each receiver circuit 421 has a receive port coupled with one second port of the independent circuit module F.

It can be found that the multiway switch of the implementation of the disclosure can enable the electronic device to be operable in the dual-frequency single-transmit mode. It is beneficial to simplifying the RF architecture of the terminal supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption. In addition, setting three independent circuit modules can also improve the performance of the switch circuit to some extent.

Figure 7:
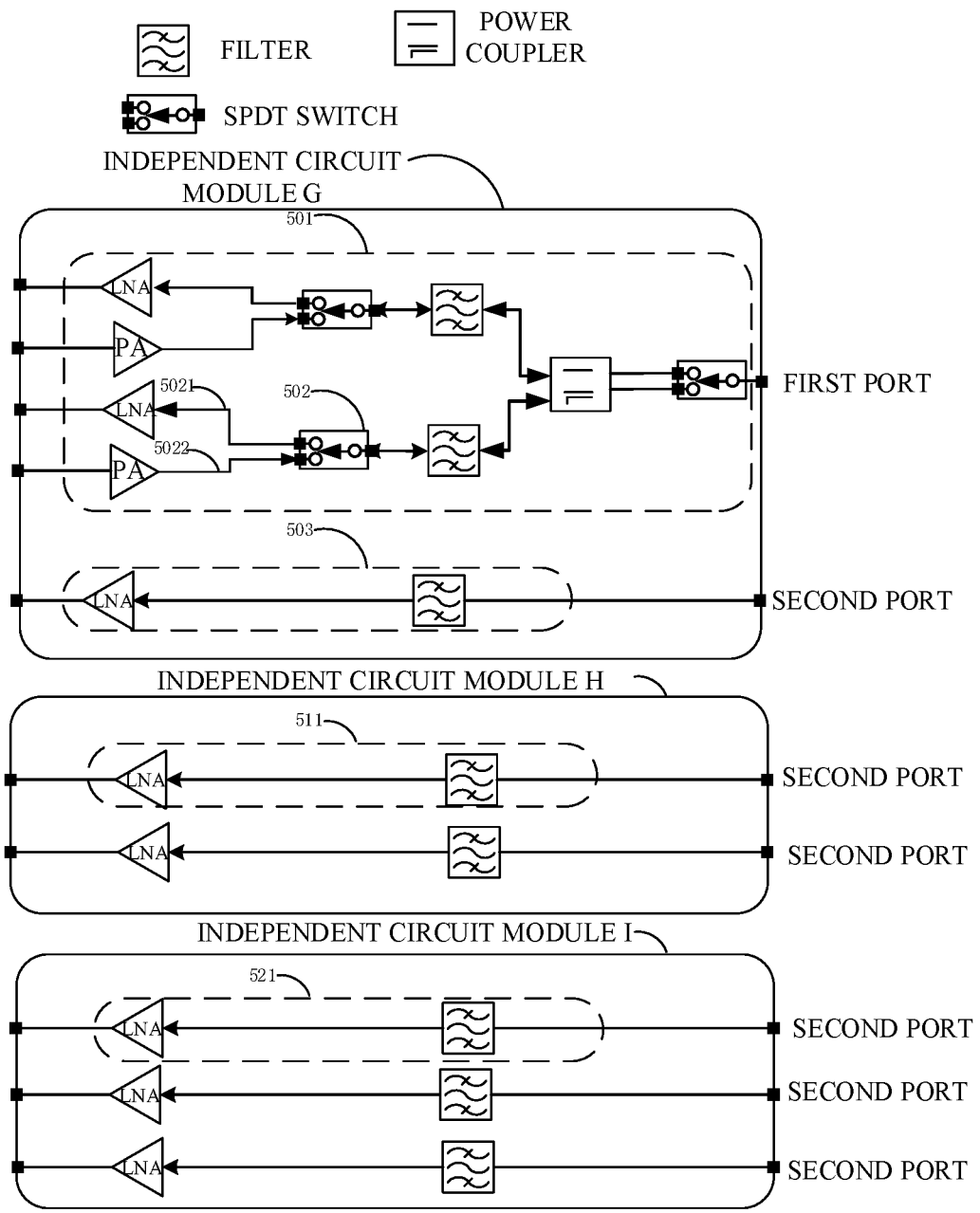
FIG. 7 is a schematic structural diagram illustrating still another radio frequency circuit according to an implementation of the disclosure.

FIG. 7 is a schematic structural diagram illustrating still another radio frequency circuit according to an implementation of the disclosure. In one possible implementation, as illustrated in FIG. 7, the radio frequency circuit 30 physically includes three independent circuit modules, that is, one first independent circuit module, one second independent circuit module, and one third independent circuit module. In this implementation, the first independent circuit module is embodied as independent circuit module G, the second independent circuit module is embodied as independent circuit module H, and the third independent circuit module is embodied as independent circuit module I. The independent circuit module G includes one first port and one second port, the first port is configured to be coupled with the first T port of the multiway switch, and the second port is configured to be coupled with one second T port of the multiway switch. The independent circuit module H and the independent circuit module I each include multiple second ports, and each second port is configured to be coupled with one second T port of the multiway switch. In one implementation, as illustrated in FIG. 7, the independent circuit module H includes two second ports and the independent circuit module I includes three second ports.

The independent circuit module G includes one transceiver integrated circuit 501 and one receiver circuit 503. The transceiver integrated circuit 501 includes two transceiver circuits 502, the two transceiver circuits have transmit-receive ports coupled with the first port of the independent circuit module G, and each transceiver circuit 502 includes one receiver circuit 5021 and one transmitter circuit 5022. The receiver circuit 503 has a receive port coupled with the second port of the independent circuit module G.

The independent circuit module H includes two receiver circuits 511 and each receiver circuit 511 has a receive port coupled with one second port of the independent circuit module H.

The independent circuit module I includes three receiver circuits 521 and each receiver circuit 521 has a receive port coupled with one second port of the independent circuit module I.

It can be seen that the multiway switch of the implementation of the disclosure can enable the electronic device to be operable in the dual-frequency single-transmit mode. It is beneficial to simplifying the RF architecture of the terminal supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption. In addition, setting three independent circuit modules can also improve the performance of the switch circuit to some extent.

Figure 8:
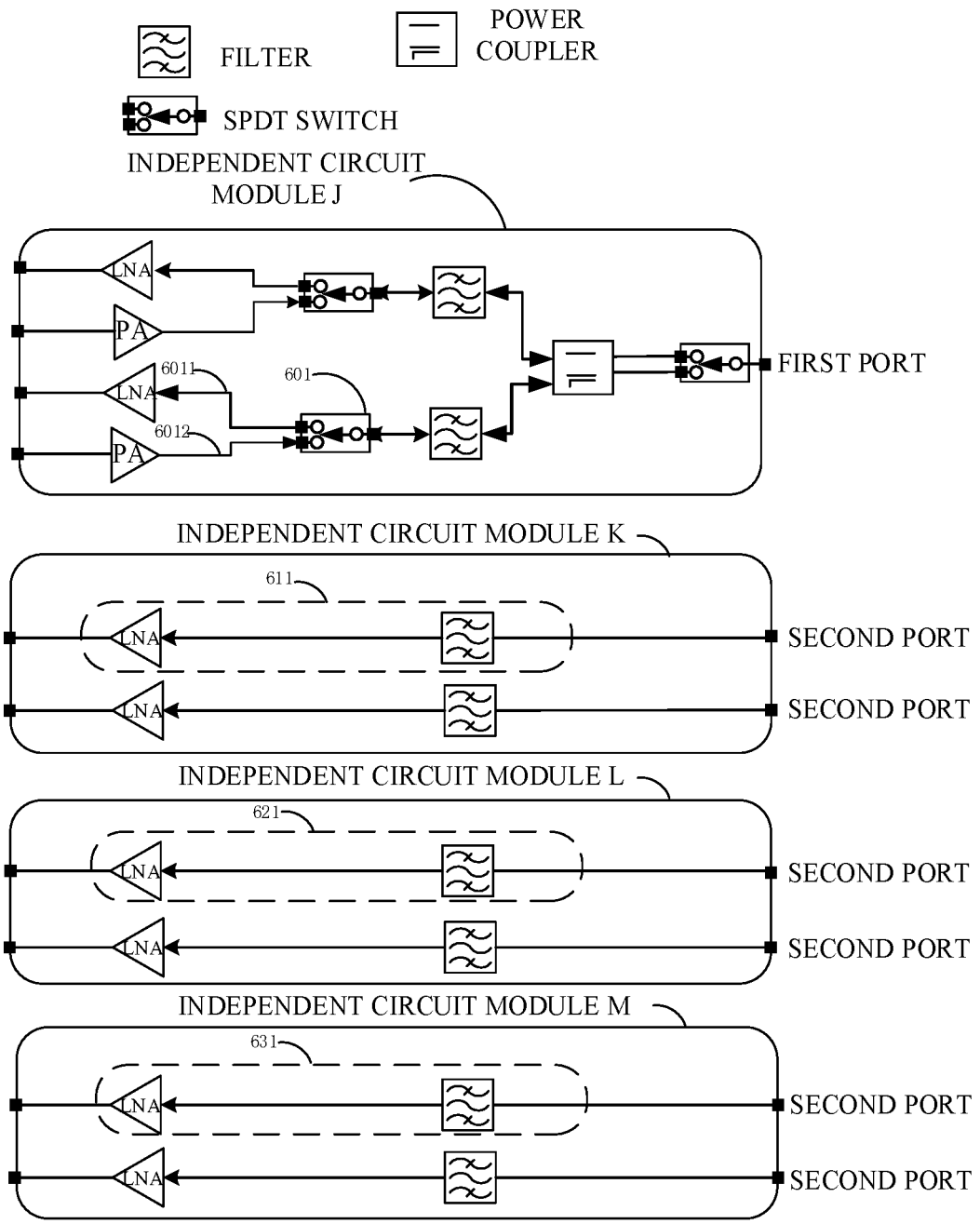
FIG. 8 is a schematic structural diagram illustrating still another radio frequency circuit according to an implementation of the disclosure.

FIG. 8 is a schematic structural diagram illustrating still another radio frequency circuit according to an implementation of the disclosure. In one possible implementation, as illustrated in FIG. 8, the radio frequency circuit 30 physically includes four independent circuit modules, that is, one first independent circuit module, one second independent circuit module, one third independent circuit module, and one fourth independent circuit module. In this implementation, the first independent circuit module is embodied as independent circuit module J, the second independent circuit module is embodied as independent circuit module K, the third independent circuit module is embodied as independent circuit module L, and the fourth independent circuit module is embodied as independent circuit module M. The independent circuit module J includes one first port configured to be coupled with the first T port of the multiway switch. The independent circuit module K, the independent circuit module L, the independent circuit module M each include multiple second ports, and each second port is configured to be coupled with one second T port of the multiway switch. In one implementation, as illustrated in FIG. 8, the independent circuit module K, the independent circuit module L, and the independent circuit module M each include two second ports.

The independent circuit module J includes one transceiver integrated circuit, the transceiver integrated circuit includes two transceiver circuits 601, the two transceiver circuits 601 have transmit-receive ports coupled with the first port of the independent circuit module J, and each transceiver circuit 601 includes one receiver circuit 6011 and one transmitter circuit 6012.

The independent circuit module K includes two receiver circuits 611, and each receiver circuit 611 has a receive port coupled with one second port of the independent circuit module K.

The independent circuit module L includes two receiver circuits 621, and each receiver circuit 621 has a receive port coupled with one second port of the independent circuit module L.

The independent circuit module M includes two receiver circuits 631, and each receiver circuit 631 has a receive port coupled with one second port of the independent circuit module M.

It can be seen that the multiway switch of the implementation of the disclosure can enable the electronic device to be operable in the dual-frequency single-transmit mode. It is beneficial to simplifying the RF architecture of the terminal supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption. In addition, setting four independent circuit modules can also improve the performance of the switch circuit to some extent.

Figure 9:
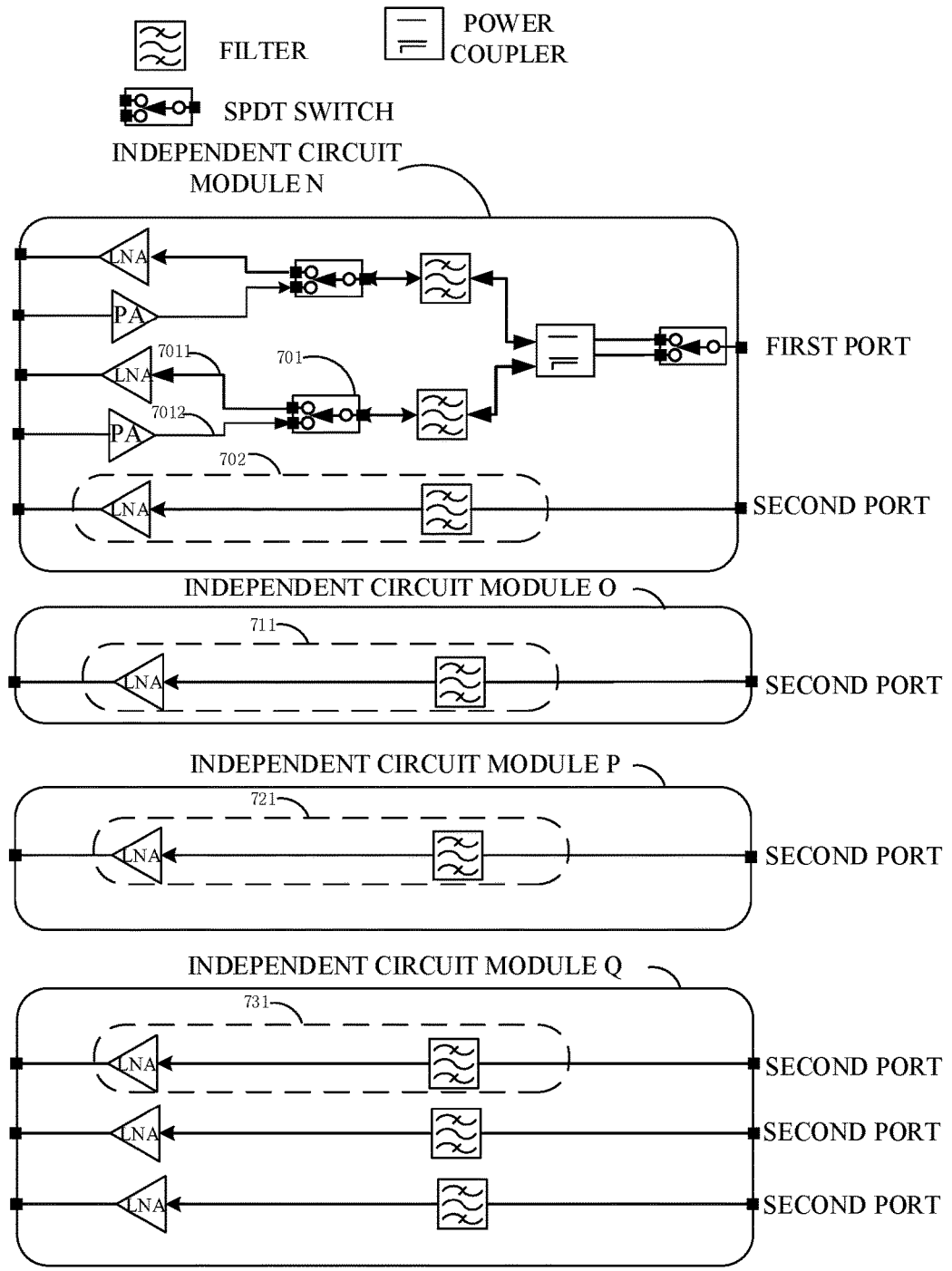
FIG. 9 is a schematic structural diagram illustrating still another radio frequency circuit according to an implementation of the disclosure.

FIG. 9 is a schematic structural diagram illustrating still another radio frequency circuit according to an implementation of the disclosure. In one possible implementation, as illustrated in FIG. 9, the radio frequency circuit 30 physically includes four independent circuit modules, that is, one first independent circuit module, one second independent circuit module, one third independent circuit module, and one fourth independent circuit module. In this implementation, the first independent circuit module is embodied as independent circuit module N, the second independent circuit module is embodied as independent circuit module O, the third independent circuit module is embodied as independent circuit module P, and the fourth independent circuit module is embodied as independent circuit module Q. The independent circuit module N includes one first port and one second port, the first port is configured to be coupled with the first T port of the multiway switch, and the second port is configured to be coupled with one second T port of the multiway switch. The independent circuit module O and the independent circuit module P each include one second port, the independent circuit module Q includes multiple second ports, and each second port is configured to be coupled with one second T port of the multiway switch. In one implementation, as illustrated in FIG. 9, the independent circuit module Q includes three second ports.

The independent circuit module N includes one transceiver integrated circuit and one receiver circuit 702. The transceiver integrated circuit includes two transceiver circuits 701, the two transceiver circuits have transmit-receive ports coupled with the first port of the independent circuit module N, and each transceiver circuit 701 includes one receiver circuit 7011 and one transmitter circuit 7012. The receiver circuit 702 has a receive port coupled with the second port of the independent circuit module N.

The independent circuit module O includes one receiver circuit 711, and the receiver circuit 711 has a receive port coupled with the second port of the independent circuit module O.

The independent circuit module P includes one receiver circuit 721, and the receiver circuit 721 has a receive port coupled with the second port of the independent circuit module P.

The independent circuit module Q includes three receiver circuits 731, and each receiver circuit 731 has a receive port coupled with one second port of the independent circuit module Q.

It can be seen that the multiway switch of the implementation of the disclosure can enable the electronic device to be operable in the dual-frequency single-transmit mode. It is beneficial to simplifying the RF architecture of the terminal supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption. In addition, setting four independent circuit modules can also improve the performance of the switch circuit to some extent.

Figure 10:
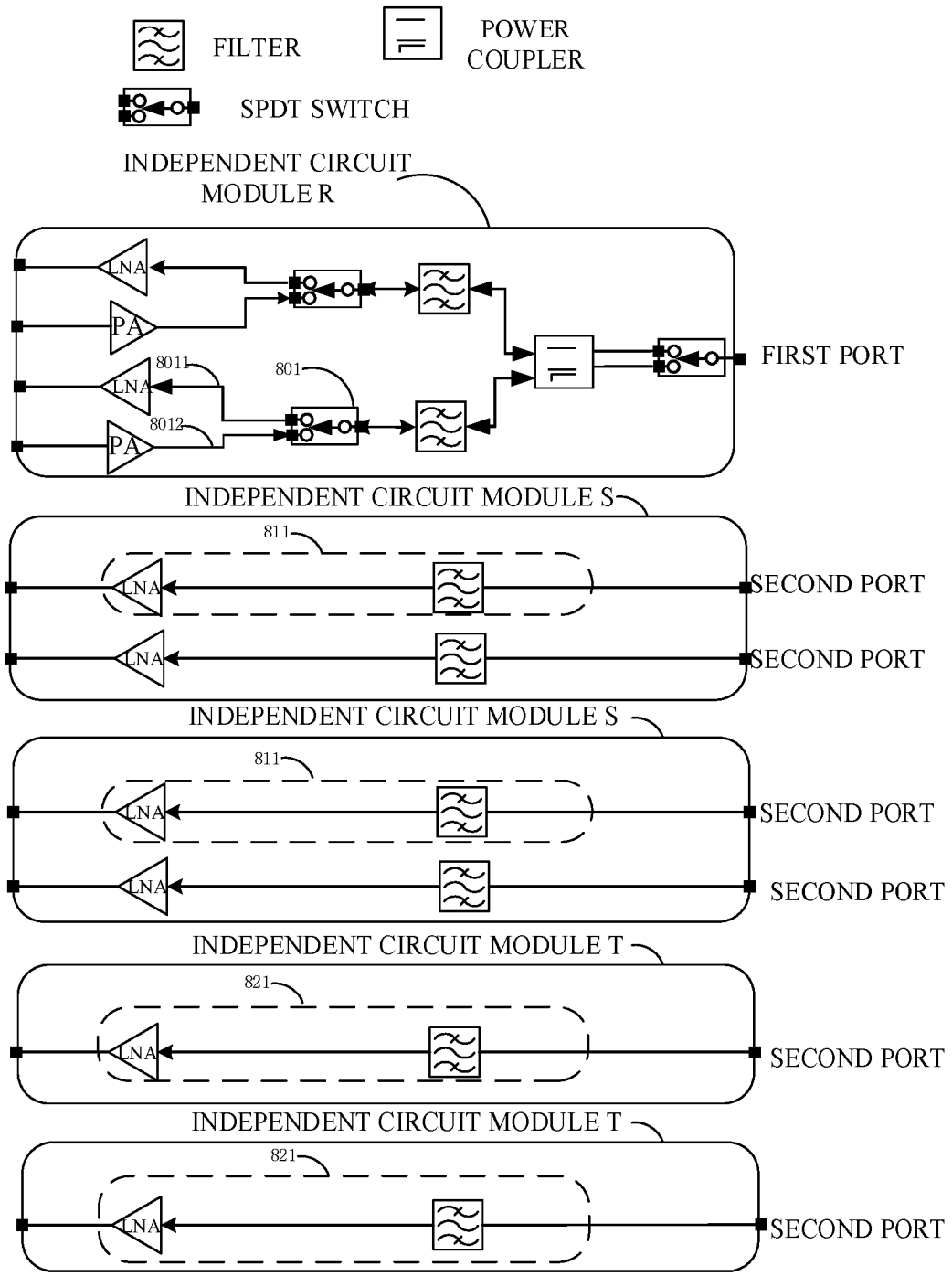
FIG. 10 is a schematic structural diagram illustrating still another radio frequency circuit according to an implementation of the disclosure.

FIG. 10 is a schematic structural diagram illustrating still another radio frequency circuit according to an implementation of the disclosure. In one possible implementation, as illustrated in FIG. 10, the radio frequency circuit 30 physically includes five independent circuit modules, that is, one first independent circuit module, two second independent circuit modules, and two third independent circuit modules. In one implementation, the first independent circuit module is embodied as independent circuit module R, the second independent circuit module is embodied as independent circuit module S, and the third independent circuit module is embodied as independent circuit module T. The independent circuit module R includes one first port configured to be coupled with the first T port of the multiway switch. Each independent circuit module S includes multiple second ports and each independent circuit module T includes one second port, where each second port is configured to be coupled with one second T port of the multiway switch. In one implementation, as illustrated in FIG. 10, each independent circuit module S includes two second ports.

The independent circuit module R includes one transceiver integrated circuit, the transceiver integrated circuit includes two transceiver circuits 801, the two transceiver circuits have transmit-receive ports coupled with the first port of the independent circuit module R, and each transceiver circuit 801 includes one receiver circuit 8011 and one transmitter circuit 8012.

Each independent circuit module S includes two receiver circuits 811 and each receiver circuit 811 has a receive port coupled with one second port of the independent circuit module S.

Each independent circuit module T includes one receiver circuit 821 and the receiver circuit 821 has a receive port coupled with the second port of the independent circuit module T.

It can be seen that the multiway switch of the implementation of the disclosure can enable the electronic device to be operable in the dual-frequency single-transmit mode. It is beneficial to simplifying the RF architecture of the terminal supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption. In addition, setting five independent circuit modules can also improve the performance of the switch circuit to some extent.

Figure 11:
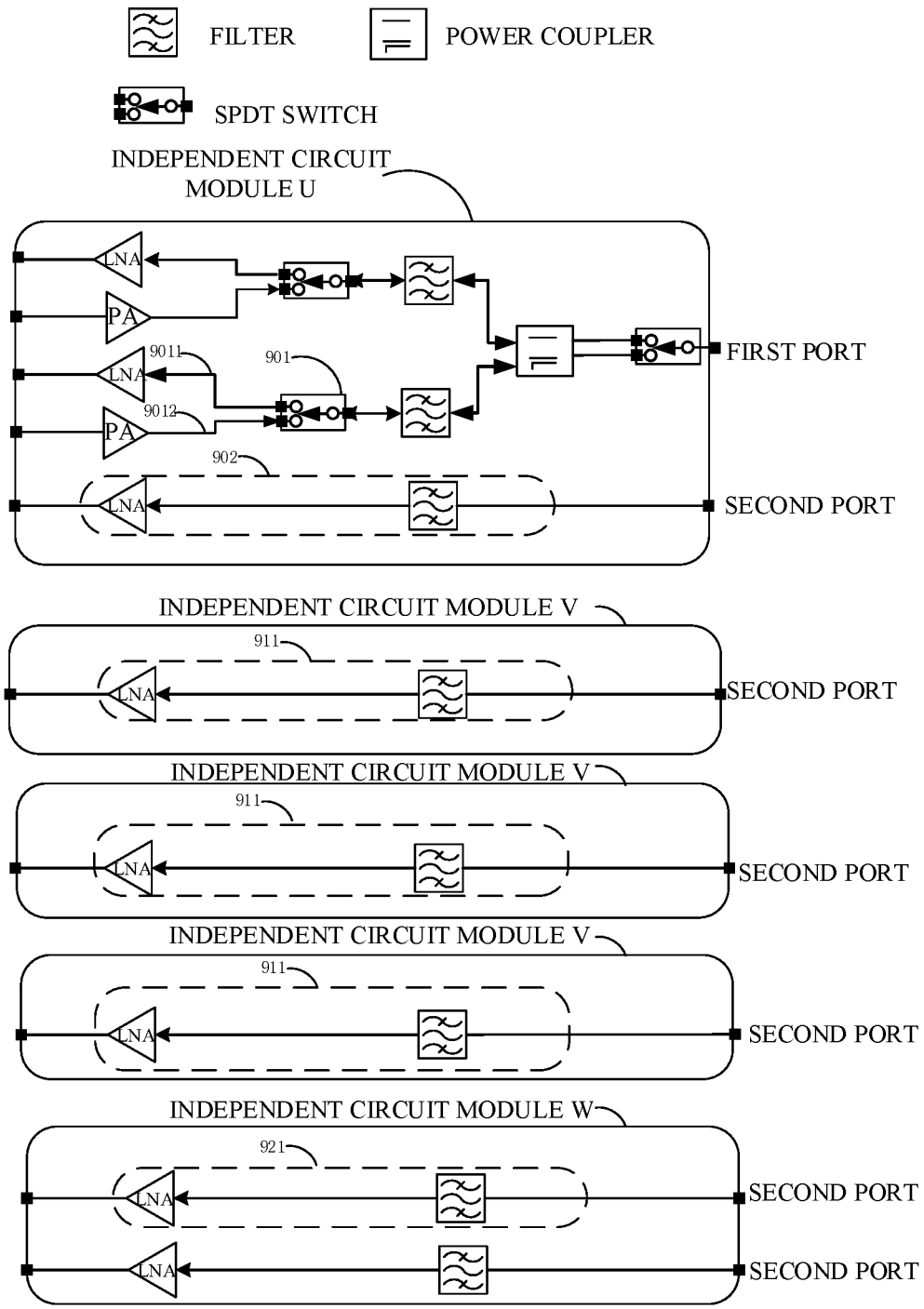
FIG. 11 is a schematic structural diagram illustrating still another radio frequency circuit according to an implementation of the disclosure.

FIG. 11 is a schematic structural diagram illustrating still another radio frequency circuit according to an implementation of the disclosure. In one possible implementation, as illustrated in FIG. 11, the five independent circuit modules include one first independent circuit module, three second independent circuit modules, and one third independent circuit module. The first independent circuit module is embodied as independent circuit module U, the second independent circuit module is embodied as independent circuit module V, and the third independent circuit module is embodied as independent circuit module W. The independent circuit module U includes one first port, and one second port, the first port is configured to be the first T port of the multiway switch, and the second port is configured to be coupled with one second T port of the multiway switch; each independent circuit module V includes one second port, the independent circuit module W includes multiple second ports, and each second port is configured to be coupled with one second T port (i.e., one of six second T ports) of the multiway switch. In one implementation, as illustrated in FIG. 11, the independent circuit module W includes two second ports.

The independent circuit module U includes one transceiver integrated circuit and one receiver circuit 902. The transceiver integrated circuit includes two transceiver circuits 901, the two transceiver circuits 901 have transmit-receive ports coupled with the first port of the independent circuit module U, and each transceiver circuit 901 includes one receiver circuit 9011 and one transmitter circuit 9012. The receiver circuit 902 has a receive port coupled with the second port of the independent circuit module U.

Each independent circuit module V includes one receiver circuit 911, and the receiver circuit 911 has a receive port coupled with the second port of the independent circuit module V.

The independent circuit module W includes two receiver circuits 921, and each receiver circuit 921 has a receive port coupled with one second port of the independent circuit module W.

It can be seen that the multiway switch of the implementation of the disclosure can enable the electronic device to be operable in the dual-frequency single-transmit mode. It is beneficial to simplifying the RF architecture of the terminal supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption. In addition, setting five independent circuit modules can also improve the performance of the switch circuit to some extent.

In one possible implementation, the radio frequency circuit of the electronic device logically includes two transmitter circuits and eight receiver circuits. The radio frequency circuit physically includes six independent circuit modules. The six independent circuit modules have a transmit-receive port configured to be coupled with the first T port and have receive ports configured to be coupled in one-to-one correspondence with the second T ports.

In one possible implementation, the radio frequency circuit of the electronic device logically includes two transmitter circuits and eight receiver circuits. The radio frequency circuit physically includes seven independent circuit modules. The seven independent circuit modules have a transmit-receive port configured to be coupled with the first T port and have receive ports configured to be coupled in one-to-one correspondence with the second T ports.

The receiver circuit and the transmitter circuit can have various configurations. The disclosure is not limited thereto. The "transmit-receive port" refers to a port (may be composed of one or more components) which implement a corresponding transmission and/or reception function and is located on the path after integration of transceiver circuits or after integration of one transmitter circuit and one receiver circuit. The "receive port" refers to a port (may be composed of one or more components) which implement a corresponding reception function and is located on the path of one receiver circuit. It should be noted that the ports such as receive ports and transmit-receive ports illustrated in the figures are exemplary and do not intent to indicate an exact port position and impose any restrictions.

In one possible implementation, the four antennas include a first antenna, a second antenna, a third antenna, and a fourth antenna. All these four antennas are operable at a fifth generation new radio (5G NR) frequency band.

In one possible implementation, the four antennas include a first antenna, a second antenna, a third antenna, and a fourth antenna. The first antenna and the fourth antenna are antennas operable at a long term evolution (LTE) frequency band and a 5G NR frequency band. The second antenna and the third antenna are antennas only operable at the 5G NR frequency band.

The first antenna and fourth antenna are intended to support DL 4×4 MIMO at some frequency bands in LTE on terminals. These two antennas are shared with the 5G NR (hereinafter, "shared antennas" for short). The LTE frequency band may include, for example, 1880-1920 MHz and 2496-2690 MHz.

Since low-noise amplifiers (LNAs) in the receiver circuit can operate simultaneously, due to their low power and low power consumption, mutual influence can be avoided through design. Therefore, multiple LNAs in multiple receiver circuits at the same frequency band can exist in the same circuit module. However, in this example, when two PAs at the same frequency band work simultaneously (corresponding to UL MIMO mode), a transmit power will be high, and two signals will interfere with each other. In addition, the two PAs will affect heat dissipation efficiency when working at the same time. Considering this, two independent circuit modules are needed to set PAs in the transmitter circuits, which is beneficial to reducing interference and improving signal processing efficiency and heat dissipation efficiency of the radio frequency system.

Figure 12:
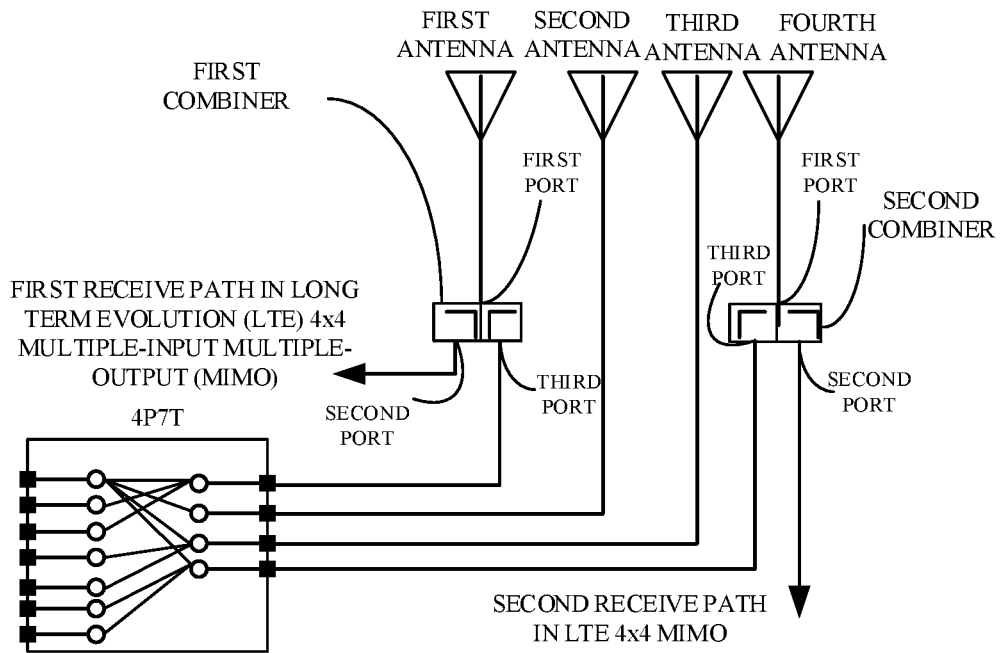
FIG. 12 is a schematic structural diagram illustrating an antenna system of an electronic device according to an implementation of the disclosure.

In one possible implementation, as illustrated in FIG. 12, the antenna system further includes a first combiner and a second combiner. The first combiner has a first port configured to be coupled with the first antenna, a second port configured to be coupled with a first receive path in LTE 4×4 multiple-input multiple-output (MIMO) configuration of the electronic device, and a third port configured to be coupled with a corresponding P port of the multiway switch. The second combiner has a first port configured to be coupled with the fourth antenna, a second port configured to be coupled with a second receive path in the LTE 4×4 MIMO configuration of the electronic device, and a third port configured to be coupled with a corresponding P port of the multiway switch.

The LTE 4*4 MIMO is a downlink LTE receive circuit and can be defined as a third receive path. Since the LTE currently has two receive paths, in order to support LTE 4×4 MIMO, the third path and a fourth receive path are added.

According to performance of the four antennas, the electronic device will arrange one antenna with better performance for the circuit for PRX (primary receiver), and the antenna will be in a standby state. Moreover, first T ports in the switch having both the transmission function and the reception function can be configured for TX (transmit) and PRX purpose, and thus the antenna can be switched arbitrarily. In this way, there is no need to restrict the coupling between ports of shared antennas.

Figure 13:
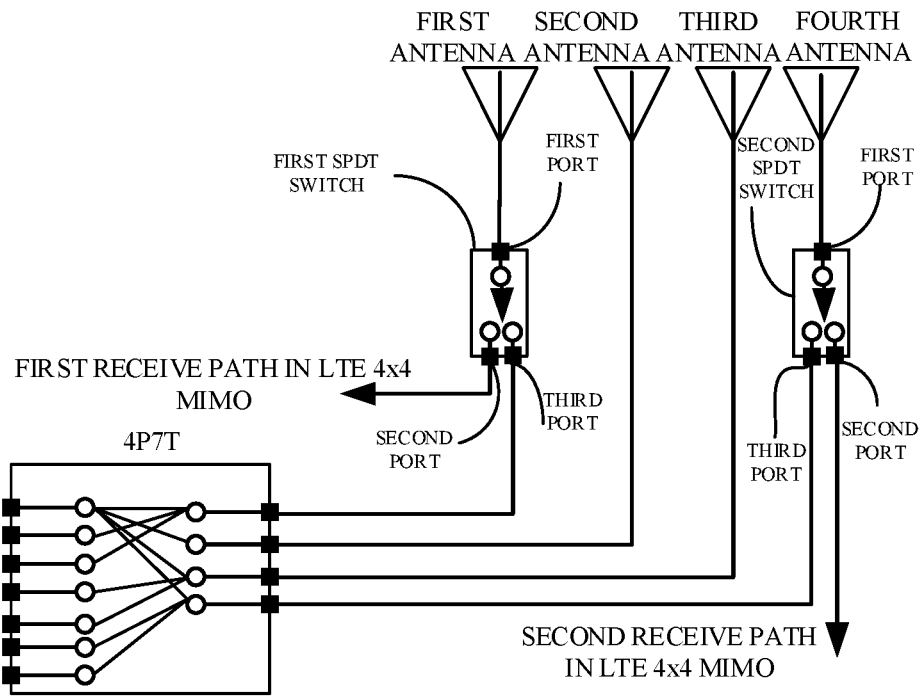
FIG. 13 is a schematic structural diagram illustrating another antenna system of an electronic device according to an implementation of the disclosure.

In one possible implementation, as illustrated in FIG. 13, the antenna system further includes a first single-pole double-throw (SPDT) switch and a second SPDT switch. The first SPDT switch has a first port configured to be coupled with the first antenna, a second port configured to be coupled with a first receive path in LTE 4×4 MIMO configuration of the electronic device, and a third port configured to be coupled with a corresponding P port of the multiway switch. The second SPDT switch has a first port configured to be coupled with the fourth antenna, a second port configured to be coupled with a second receive path in the LTE 4×4 MIMO configuration of the electronic device, and a third port configured to be coupled with a corresponding P port of the multiway switch.

As can be seen, for the transmit paths and the receive paths of the radio frequency system of the electronic device, the transmit paths can include one single independent switch (a 4P7T switch) or two independent switches (a SPDT switch and a 4P7T switch) and the receive paths can include one single independent switch (a 4P7T switch) or two independent switches (a SPDT switch and a 4P7T switch). That is to say, by integrating more switch functions of the transmit paths and the receive paths of the radio frequency system into the 4P7T switch, the number of independent switches of the transmit paths and the receive paths can be effectively reduced.

Figure 14A:
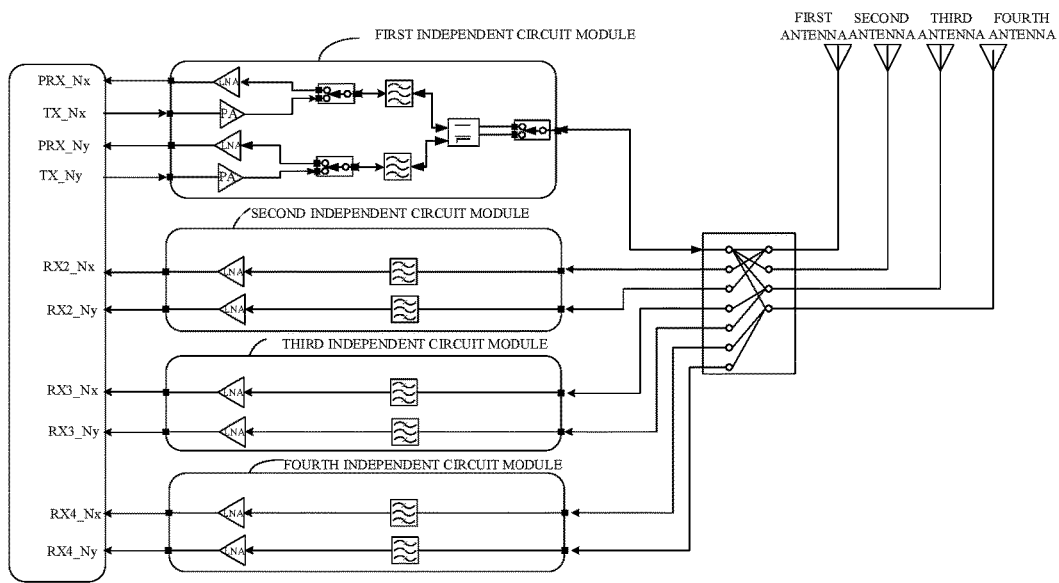
FIG. 14A is a schematic structural diagram illustrating a radio frequency system according to an implementation of the disclosure.

FIG. 14A is a schematic structural diagram illustrating a radio frequency system according to an implementation of the present disclosure. The overall architecture of the radio frequency system of the electronic device is illustrated in FIG. 14A. When the electronic device transmits data through a frequency band Nx, the working process of the radio frequency system is as follows. A radio frequency transceiver sends, through a transmit port "TX_Nx" at the frequency band Nx, a transmit signal to a PA of a first independent circuit module coupled with the transmit port "TX_Nx". The PA sends the transmit signal received to a first port of the first independent circuit module through a filter and a coupler of one transceiver circuit. Due to the fact that a first T port of the multiway switch with which the first port is coupled a fully-coupled port supporting a signal transmission function, the first port can send two transmit signals to four P ports through the first T port of the multiway switch in the same period. In this situation, the four P ports transmit the two transmit-signals through antennas corresponding to each P port in four channels of data to external devices simultaneously.

Similarly, when the electronic device receives data through a frequency band Ny, the working process of the radio frequency system is as follows. The four antennas send four receive signals respectively to the four P ports of the multiway switch in the same time period. The four P ports send the four receive signals received to four T ports of the multiway switch respectively, each of the four T ports receives one receive signal from a corresponding P port. Each of the four T ports sends, through a first port of a first independent circuit module or a second port of a second independent circuit module, a third independent circuit module, and a fourth independent circuit module, the receive signal to each of four receiver circuits of the first independent circuit module, the second independent circuit module, the third independent circuit module, and the fourth independent circuit module, where each receiver circuit corresponds to a receive port at a frequency band Ny of the radio frequency transceiver. Each receiver circuit sends the receive signal received to the receive port at the frequency band Ny of the radio frequency transceiver through a filter and an LNA, thereby implementing four receive-signal paths of the electronic device.

Figure 14B:
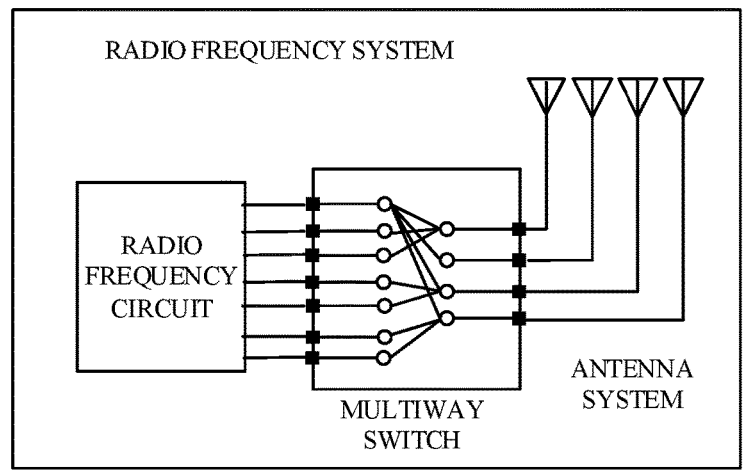
FIG. 14B is a schematic structural diagram illustrating another radio frequency system according to an implementation of the disclosure.

In another implementation, As illustrated in FIG. 14B, an radio frequency system is provided. The radio frequency system includes an antenna system, a radio frequency circuit, and a multiway switch coupled with the radio frequency circuit and the antenna system.

The multiway switch includes seven T ports and four P ports. The seven T ports include one first T port at least supporting a transmission function and six second T ports supporting only a reception function. The first T port is coupled with all of the four P ports and each of the six second T ports is coupled with one of the four P ports and T ports at the same frequency band in the six second T ports are coupled with different P ports. Each of the four P ports is configured to be coupled with a corresponding antenna of the four antennas. The antenna system includes four antennas corresponding to the four P ports and the multiway switch is configured to implement a preset function of transmitting an SRS through the four antennas in turn.

Figure 15:
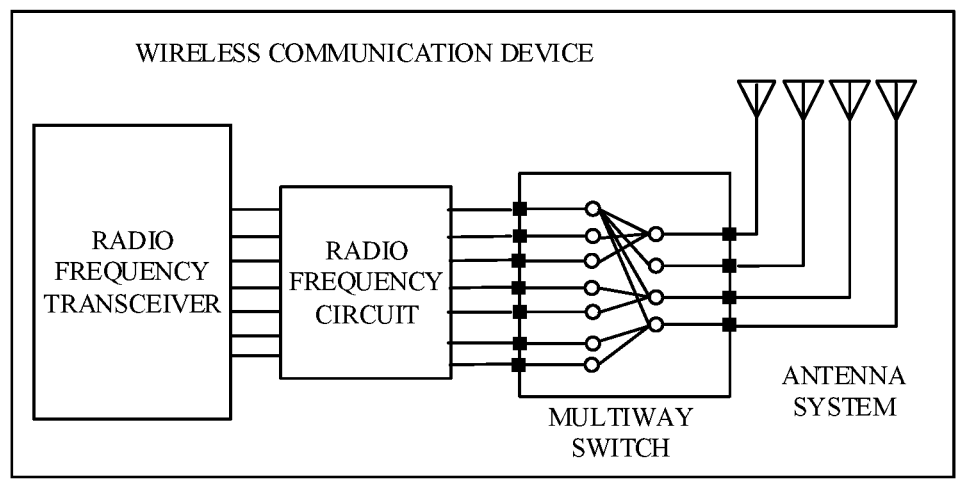
FIG. 15 is a schematic structural diagram illustrating a wireless communication device according to an implementation of the disclosure.

FIG. 15 is a schematic structural diagram illustrating a wireless communication device according to an implementation of the disclosure. The wireless communication device can be a mobile terminal, a base station, and the like, and includes an antenna system, a radio frequency transceiver, a radio frequency circuit coupled with the radio frequency transceiver, and a multiway switch coupled with the radio frequency circuit and the antenna system.

The multiway switch includes seven T ports and four P ports. The seven T ports include one first T port at least supporting a transmission function and six second T ports supporting only a reception function. The first T port is coupled with all of the four P ports and each of the six second T ports is coupled with one of the four P ports and T ports at the same frequency band in the six second T ports are coupled with different P ports. Each of the four P ports is configured to be coupled with a corresponding antenna of the four antennas. The antenna system includes four antennas corresponding to the four P ports and the multiway switch is configured to implement a preset function of transmitting an SRS through the four antennas in turn.

Figure 16:
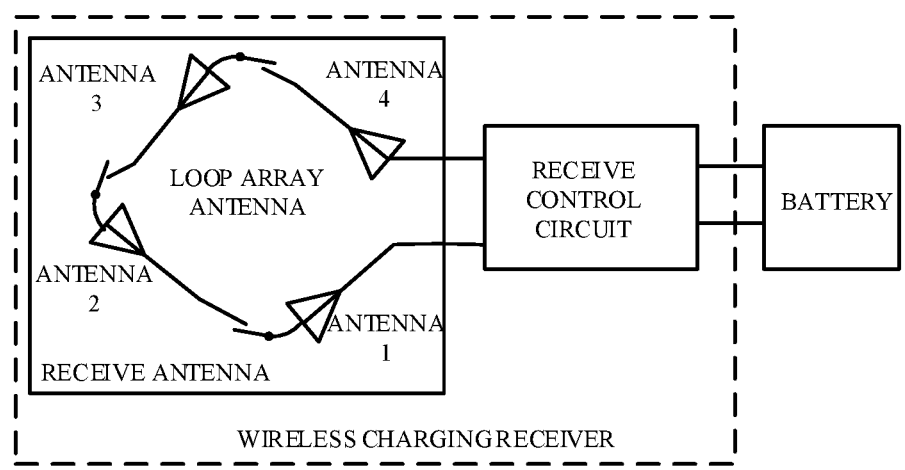
FIG. 16 is a schematic diagram illustrating a wireless charging receiver for multiplexing an antenna of a wireless communication device according to an implementation of the disclosure.

In addition, as illustrated in FIG. 16, the four antennas in the antenna system described in the implementations of the disclosure can also be multiplexed by a wireless charging receiver of the electronic device. The wireless charging receiver includes a receive antenna and a receive control circuit. The receive antenna matches transmit antennas of a wireless charging transmitter (resonates at the same or similar frequency and transfers energy in a wireless manner in the way of radiative resonant magnetic coupling). The receive control circuit converts, through a loop array antenna, the energy into a direct current (DC) to output to charge a battery. The receive control circuit can dynamically adjust a frequency of the loop array antenna and match the frequency of the loop array antenna with frequencies of the transmit antennas of the wireless charging transmitter to achieve paired charging. Alternatively, the receive control circuit interacts with the wireless charging transmitter in real time on a frequency change range to implement an "exclusive encryption" wireless charging mode.

The receive antenna may be an antenna include at least one of the four antennas (in the case of multiple antennas, the multiple antennas are strobed via switches).

Figure 17:
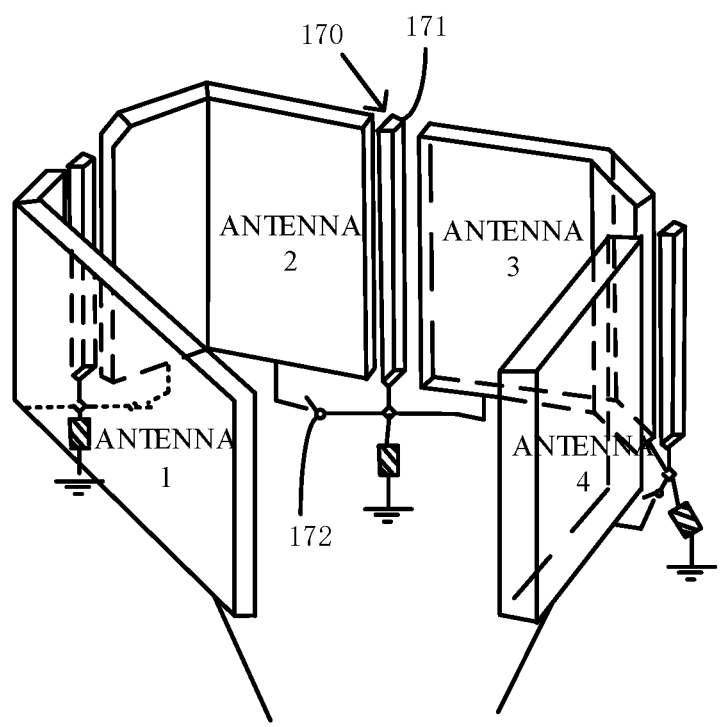
FIG. 17 is a schematic structural diagram illustrating a loop array antenna including four antennas according to an implementation of the disclosure.

For example, as illustrated in FIG. 17, the receive antenna is a loop array antenna including the four antennas described above. The four antennas include antenna 1, antenna 2, antenna 3, and antenna 4. Antenna 1 and antenna 4 are operable at both a LTE frequency band and a 5G NR frequency band, while antenna 2 and antenna 3 are only operable at the 5G NR frequency band. A port of antenna 1 and a port of antenna 4 are used as ports of the loop array antenna. Adjacent antennas are coupled via a gate circuit 170 with an isolation function. The gate circuit 170 includes a spacer 171 and a switch 172, where the spacer 171 is a conductor and the switch 172 is further coupled with a controller. The electronic device can conduct the switch 172 of each gate circuit 170 in a wireless charging mode to form a loop array antenna to receive energy. By adding the spacers 171 among the antennas, the gate circuit 170 can reduce mutual coupling among the multiple antennas of the electronic device in a normal communication mode, improve isolation among the multiple antennas, and optimize performance of the antennas. On the other hand, the multiple antennas can be coupled in series to form the loop array antenna through the switches 172, so as to better match the transmit antennas to transfer energy. Furthermore, since the capabilities of antenna 1 and antenna 4 are stronger than those of antenna 2 and antenna 3, the loop array antenna thus arranged can reduce energy loss in transmission as much as possible.

While the disclosure has been described in connection with certain implementations, it is to be pointed out that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multiway switch configured to be coupled with a radio frequency circuit and an antenna system, the multiway switch comprising:
    seven T ports and $2^n$ P ports; n being an integer and $n \geq 2$;
    the seven T ports comprising one first T port at least supporting a transmission function and six second T ports supporting only a reception function;
    the first T port being coupled with all of the $2^n$ P ports;
    each of the six second T ports being coupled with one of the $2^n$ P ports, and T ports at the same frequency band in the six second T ports being coupled with different P ports; and
    each of the $2^n$ P ports being configured to be coupled with a corresponding antenna of $2^n$ antennas;
    the antenna system comprising the $2^n$ antennas corresponding to the $2^n$ P ports; and
    the multiway switch being configured to implement a preset function of transmitting a sounding reference signal (SRS) through the $2^n$ antennas in turn.

2. The multiway switch of claim 1, wherein
    the radio frequency circuit of the electronic device logically comprises two transmitter circuits and $2^{n+1}$ receiver circuits;
    the radio frequency circuit physically comprises m independent circuit module(s), m is an integer, and $m \geq 1$;
    the m independent circuit modules have a transmit-receive port configured to be coupled with the first T port; and
    the m independent circuit modules have receive ports configured to be coupled in one-to-one correspondence with the six second T ports.

3. The multiway switch of claim 2, wherein
    when n=2, the radio frequency circuit of the electronic device logically comprises two transmitter circuits and eight receiver circuits;
    when m=1, the radio frequency circuit physically comprises one independent circuit module;
    the independent circuit module has a transmit-receive port configured to be coupled with the first T port; and
    the independent circuit module has receive ports configured to be coupled in one-to-one correspondence with the six second T ports.

4. The multiway switch of claim 3, wherein the independent circuit module is embodied as one first independent circuit module, wherein
    the first independent circuit module comprises one first port and a plurality of second ports, the first port is configured to be coupled with the first T port of the multiway switch, and the plurality of second ports are configured to be coupled with the six second T ports of the multiway switch; and
    the first independent circuit module comprises one transceiver integrated circuit and six receiver circuits, wherein the transceiver integrated circuit comprises two transceiver circuits, and each transceiver circuit comprises one receiver circuit and one transmitter circuit, and each receiver circuit has a receive port coupled with one second port of the first independent circuit module.

5. The multiway switch of claim 4, wherein
    each receiver circuit of the first independent circuit module comprises a low noise amplifier (LNA) and a filter, the filter has an input port coupled with one first port or one second port of the first independent circuit module to which the receiver circuit belongs and has an output port coupled with an input port of the LNA, and the LNA has an output port configured to be coupled with a corresponding port of a radio frequency transceiver;
    each transceiver circuit of the transceiver integrated circuit is realized through one receiver circuit and one transmitter circuit that are integrated via a switch; the receiver circuit comprises an LNA with an input port and the transmitter circuit comprises a power amplifier (PA) with an output port, and the input port of the LNA and the output port of the PA are coupled with the switch; the switch is coupled with a filter, the filter is coupled with a power coupler, and the power coupler is coupled with the first port of the first independent circuit module; and the transceiver integrated circuit comprises two transceiver circuits operable at different frequency bands, the two transceiver circuits share an input port of the power coupler, wherein the power coupler has an output port coupled with the first port of the first independent circuit module through the switch.

6. The multiway switch of claim 2, wherein when n=2, the radio frequency circuit of the electronic device logically comprises two transmitter circuits and eight receiver circuits;

when m=2, the radio frequency circuit physically comprises two independent circuit modules;

the two independent circuit modules have a transmit-receive port configured to be coupled with the first T port; and the two independent circuit modules have receive ports configured to be coupled in one-to-one correspondence with the six second T ports.

7. The multiway switch of claim 6, wherein the two independent circuit modules comprise one first independent circuit module and one second independent circuit module, wherein the first independent circuit module comprises one first port configured to be coupled with the first T port of the multiway switch; the second independent circuit module comprises a plurality of second ports configured to be coupled with the six second T ports of the multiway switch;

the first independent circuit module comprises one transceiver integrated circuit, the transceiver integrated circuit comprises two transceiver circuits, the two transceiver circuits have transmit-receive ports coupled with the first port of the first independent circuit module, and each transceiver circuit comprises one receiver circuit and one transmitter circuit; and the second independent circuit module comprises six receiver circuits, and each receiver circuit has a receive port coupled with one second port of the second independent circuit module.

8. The multiway switch of claim 2, wherein when n=2, the radio frequency circuit of the electronic device logically comprises two transmitter circuits and eight receiver circuits;

when m=3, the radio frequency circuit physically comprises three independent circuit modules;

the three independent circuit modules have a transmit-receive port configured to be coupled with the first T port; and the three independent circuit modules have receive ports configured to be coupled in one-to-one correspondence with the six second T ports.

9. The multiway switch of claim 8, wherein the three independent circuit modules comprise one first independent circuit module, one second independent circuit module, and one third independent circuit module, wherein the first independent circuit module comprises one first port configured to be coupled with the first T port of the multiway switch; the second independent circuit module and the third independent circuit module each comprise a plurality of second ports, and each second port is configured to be coupled with one of the six second T ports of the multiway switch;

the first independent circuit module comprises one transceiver integrated circuit, the transceiver integrated circuit comprises two transceiver circuits, the two transceiver circuits have transmit-receive ports coupled with the first port of the first independent circuit module, and each transceiver circuit comprises one receiver circuit and one transmitter circuit;

the second independent circuit module comprises three receiver circuits, and each receiver circuit has a receive port coupled with one second port of the second independent circuit module; and the third independent circuit module comprises three receiver circuits, and each receiver circuit has a receive port coupled with one second port of the third independent circuit module.

10. The multiway switch of claim 8, wherein the three independent circuit modules comprise one first independent circuit module, one second independent circuit module, and one third independent circuit module, wherein the first independent circuit module comprises one first port and one second port, the first port is configured to be coupled with the first T port of the multiway switch, and the second port is configured to be coupled with one of the six second T ports of the multiway switch;

the second independent circuit module and the third independent circuit module each comprise a plurality of second ports, and each second port is configured to be coupled with one one of the six second T ports of the multiway switch;

the first independent circuit module comprises one transceiver integrated circuit and one receiver circuit; the transceiver integrated circuit comprises two transceiver circuits, the two transceiver circuits have transmit-receive ports coupled with the first port of the first independent circuit module, and each transceiver circuit comprises one receiver circuit and one transmitter circuit;

the receiver circuit has a receive port coupled with the second port of the first independent circuit module;

the second independent circuit module comprises two receiver circuits, and each receiver circuit has a receive port coupled with one second port of the second independent circuit module; and the third independent circuit module comprises three receiver circuits, and each receiver circuit has a receive port coupled with one second port of the third independent circuit module.

11. The multiway switch of claim 2, wherein when n=2, the radio frequency circuit of the electronic device logically comprises two transmitter circuits and eight receiver circuits;

when m=4, the radio frequency circuit physically comprises four independent circuit modules;

the four independent circuit modules have a transmit-receive port configured to be coupled with the first T port; and the four independent circuit modules have receive ports configured to be coupled in one-to-one correspondence with the six second T ports.

12. The multiway switch of claim 11, wherein the four independent circuit modules comprise one first independent circuit module, one second independent circuit module, one third independent circuit module, and one fourth independent circuit module, wherein the first independent circuit module comprises one first port configured to be coupled with the first T port of the multiway switch; the second independent circuit module, the third independent circuit module, the fourth independent circuit module each comprise a plurality of second ports, and each second port is configured to be coupled with one of the six second T ports of the multiway switch;

the first independent circuit module comprises one transceiver integrated circuit, the transceiver integrated circuit comprises two transceiver circuits, the two transceiver circuits have transmit-receive ports coupled with the first port of the first independent circuit module, and each transceiver circuit comprises one receiver circuit and one transmitter circuit;

the second independent circuit module comprises two receiver circuits, and each receiver circuit has a receive port coupled with one second port of the second independent circuit module;

the third independent circuit module comprises two receiver circuits, and each receiver circuit has a receive port coupled with one second port of the third independent circuit module; and the fourth independent circuit module comprises two receiver circuits, and each receiver circuit has a receive port coupled with one second port of the fourth independent circuit module.

13. The multiway switch of claim 11, wherein the four independent circuit modules comprise one first independent circuit module, one second independent circuit module, one third independent circuit module, and one fourth independent circuit module, wherein the first independent circuit module comprises one first port and one second port, the first port is configured to be coupled with the first T port of the multiway switch, and the second port is configured to be coupled with one of the six second T ports of the multiway switch; the second independent circuit module and the third independent circuit module each comprise one second port, the fourth independent circuit module comprises a plurality of second ports, and each second port is configured to be coupled with one of the six second T ports of the multiway switch;

the first independent circuit module comprises one transceiver integrated circuit and one receiver circuit, the transceiver integrated circuit comprises two transceiver circuits, the two transceiver circuits have transmit-receive ports coupled with the first port of the first independent circuit module, and each transceiver circuit comprises one receiver circuit and one transmitter circuit;

the receiver circuit has a receive port coupled with the second port of the first independent circuit module;

the second independent circuit module comprises one receiver circuit, and the receiver circuit has a receive port coupled with the second port of the second independent circuit module;

the third independent circuit module comprises one receiver circuit, and the receiver circuit has a receive port coupled with the second port of the third independent circuit module; and the fourth independent circuit module comprises three receiver circuits, and each receiver circuit has a receive port coupled with one second port of the fourth independent circuit module.

14. The multiway switch of claim 2, wherein when n=2, the radio frequency circuit of the electronic device logically comprises two transmitter circuits and eight receiver circuits;

when m=5, the radio frequency circuit physically comprises five independent circuit modules;

the five independent circuit modules have a transmit-receive port configured to be coupled with the first T port; and the five independent circuit modules have receive ports configured to be coupled in one-to-one correspondence with the six second T ports.

15. The multiway switch of claim 14, wherein the five independent circuit modules comprise one first independent circuit module, two second independent circuit modules, and two third independent circuit modules, wherein the first independent circuit module comprises one first port configured to be coupled with the first T port of the multiway switch;

each second independent circuit module comprises a plurality of second ports, each third independent circuit module comprises one second port, and each second port is configured to be coupled with one of the six second T ports of the multiway switch;

the first independent circuit module comprises one transceiver integrated circuit, the transceiver integrated circuit comprises two transceiver circuits, the two transceiver circuits have transmit-receive ports coupled with the first port of the first independent circuit module, and each transceiver circuit comprises one receiver circuit and one transmitter circuit;

each second independent circuit module comprises two receiver circuits, and each receiver circuit has a receive port coupled with one second port of the second independent circuit module; and each third independent circuit module comprises one receiver circuit, and the receiver circuit has a receive port coupled with the second port of the third independent circuit module.

16. The multiway switch of claim 14, wherein the five independent circuit modules comprise one first independent circuit module, three second independent circuit modules, and one third independent circuit module, wherein the first independent circuit module comprises one first port and one second port, the first port is configured to be coupled with the first T port of the multiway switch, and the second port is configured to be coupled with of the six second T ports of the multiway switch; each second independent circuit module comprises one second port, the third independent circuit module comprises a plurality of second ports, and each second port is configured to be coupled with one of the six second T ports of the multiway switch;

the first independent circuit module comprises one transceiver integrated circuit and one receiver circuit, the transceiver integrated circuit comprises two transceiver circuits, the two transceiver circuits have transmit-receive ports coupled with the first port of the first independent circuit module, and each transceiver circuit comprises one receiver circuit and one transmitter circuit; the receiver circuit has a receive port coupled with the second port of the first independent circuit module;

each second independent circuit module comprises one receiver circuit and the receiver circuit has a receive port coupled with the second port of the second independent circuit module; and the third independent circuit module comprises two receiver circuits, and each receiver circuit has a receive port coupled with one second port of the third independent circuit module.

17. The multiway switch of claim 1, wherein when n=2, and the multiway switch comprises forty-one field-effect transistors.

18. A radio frequency system, comprising: an antenna system, a radio frequency circuit, and a multiway switch coupled with the radio frequency circuit and the antenna system;

the multiway switch comprising seven T ports and $2^n$ P ports; n being an integer and n≥2;

the seven T ports comprising one first T port at least supporting a transmission function and six second T ports supporting only a reception function;

the first T port being coupled with all of the $2^n$ P ports;

each of the six second T ports being coupled with one of the $2^n$ P ports and T ports at the same frequency band in the six second T ports being coupled with different P ports; and each of the $2^n$ P ports being configured to be coupled with a corresponding antenna of the $2^n$ antennas;

the antenna system comprising the $2^n$ antennas corresponding to the $2^n$ P ports; and the multiway switch being configured to implement a preset function of transmitting a sounding reference signal (SRS) through the $2^n$ antennas in turn.

19. A wireless communication device, comprising: an antenna system, a radio frequency transceiver, a radio frequency circuit coupled with the radio frequency transceiver, and a multiway switch coupled with the radio frequency circuit and the antenna system;

the multiway switch comprising seven T ports and $2^n$ P ports; n being an integer and n≥2;

the seven T ports comprising one first T port at least supporting a transmission function and six second T ports supporting only a reception function;

the first T port being coupled with all of the $2^n$ P ports;

each of the six second T ports being coupled with one of the $2^n$ P ports and T ports at the same frequency band in the six second T ports being coupled with different P ports; and each of the $2^n$ P ports being configured to be coupled with a corresponding antenna of the $2^n$ antennas;

the antenna system comprising the $2^n$ antennas corresponding to the $2^n$ P ports; and the multiway switch being configured to implement a preset function of transmitting a sounding reference signal (SRS) through the $2^n$ antennas in turn.

* * * * *